US012785532B2

(12) United States Patent
Cooke et al.

(10) Patent No.: US 12,785,532 B2
(45) Date of Patent: Nov. 3, 2026

(54) MAGNETICALLY GEARED APPARATUS AND ROTOR WITH FLUX SHIELD

(71) Applicant: MAGNOMATICS LIMITED, Sheffield South Yorkshire (GB)

(72) Inventors: Glynn Cooke, Sheffield South Yorkshire (GB); Radu-Stefan Dragan, Sheffield South Yorkshire (GB); David Powell, Sheffield South Yorkshire (GB); Gregg Wilson, Sheffield South Yorkshire (GB); Stuart Calverley, Sheffield South Yorkshire (GB)

(73) Assignee: Magnomatics Limited, Sheffield South Yorkshire (GB)

( * ) Notice: Subject to any disclaimer, the term of this patent is extended or adjusted under 35 U.S.C. 154(b) by 204 days.

(21) Appl. No.: 18/527,791

(22) Filed: Dec. 4, 2023

(65) Prior Publication Data

US 2024/0106314 A1 Mar. 28, 2024

Related U.S. Application Data

(63) Continuation of application No. PCT/GB2022/051344, filed on May 26, 2022.

(30) Foreign Application Priority Data

Jun. 7, 2021 (GB) ..................................... 2108117

(51) Int. Cl.
*H02K 49/10* (2006.01)
*H02K 11/01* (2016.01)

(52) U.S. Cl.
CPC ......... *H02K 49/102* (2013.01); *H02K 11/012* (2020.08)

(58) Field of Classification Search
CPC .... H02K 49/102; H02K 49/10; H02K 11/012; H02K 16/02; H02K 2213/03
(Continued)

(56) References Cited

U.S. PATENT DOCUMENTS 8,575,804 B2 11/2013 Nakatsugawa et al.
10,680,502 B2 6/2020 Powell et al.
(Continued)

FOREIGN PATENT DOCUMENTS

CN 106877627 A 6/2017
CN 107465330 A 12/2017
(Continued)

OTHER PUBLICATIONS

PCT Patent Application PCT/GB2022/051344 International Search Report and Written Opinion dated Sep. 11, 2022.
(Continued)

*Primary Examiner* — Michael Andrews
(74) *Attorney, Agent, or Firm* — Erise IP, P.A.

(57) ABSTRACT

The present disclosure relates to a magnetically geared apparatus. In an example the magnetically geared comprises: a first mover comprising a plurality of first permanent magnets; a stator; a second mover; and a flux shield aligned with the first plurality of permanent magnets for attenuating magnetic flux. One of the stator and the second mover comprises a plurality of pole pieces and is positioned between the first mover and the other of the stator and the second mover. The first mover, the stator and the second mover are aligned in a first direction, and wherein the flux shield is spaced from the plurality of first permanent magnets in a second direction perpendicular to the first direction by a nonmagnetic region, thereby attenuating magnetic flux in the second direction.

16 Claims, 26 Drawing Sheets

(58) Field of Classification Search
USPC .................................................. 310/103, 104
See application file for complete search history.

(56) References Cited

U.S. PATENT DOCUMENTS

| | | | | | |
|---|---|---|---|---|---|
| 2012/0094555 | A1* | 4/2012 | Calverley | H02K 7/11 | 440/6 |
| 2012/0194021 | A1* | 8/2012 | Nakatsugawa | H02K 49/102 | 310/103 |
| 2013/0221778 | A1* | 8/2013 | Kusase | H02K 7/108 | 310/78 |
| 2017/0080136 | A1 | 3/2017 | Janeczek | | |
| 2018/0269770 | A1* | 9/2018 | Powell | H02K 49/102 | |
| 2019/0157962 | A1* | 5/2019 | Powell | H02K 16/02 | |

FOREIGN PATENT DOCUMENTS

| | | | | | |
|---|---|---|---|---|---|
| CN | 108282074 | A | | 7/2018 | |
| DE | 102016210310 | A1 | | 12/2017 | |
| GB | 675379 | A | * | 7/1952 | H02K 49/108 |
| GB | 2501018 | A | | 10/2013 | |
| JP | 2002267993 | A | | 9/2002 | |
| JP | 2009535012 | A | | 9/2009 | |
| JP | 2020506651 | A | | 2/2020 | |
| WO | 2018196338 | A1 | | 11/2018 | |
| WO | 2019184580 | A1 | | 10/2019 | |

OTHER PUBLICATIONS

Great Britain Patent Application 2108117.9 Search Report dated Dec. 2, 2021.

Great Britain Patent Application GB2108117.9, Examination Report under Section 18 (3), issued Feb. 16, 2026.

Japanese Patent Application 2023-572991, Office Action, issued May 22, 2026.

* cited by examiner

MAGNETICALLY GEARED APPARATUS AND ROTOR WITH FLUX SHIELD

RELATED APPLICATION

This application is a continuation of PCT Patent Application PCT/GB2022/051344, filed May 26, 2022, which claims priority to Great Britain Patent Application No. 2108117.9, filed Jun. 7, 2021, the disclosures of which are incorporated herein by reference.

FIELD

The present disclosure relates to a magnetically geared apparatus, and to a rotor for a magnetically geared apparatus.

BACKGROUND

Magnetically geared apparatuses for transmitting torque between two or more moving components without mechanical contact are known. Magnetically geared apparatuses have many advantages over mechanically geared apparatus. For example, frictional losses are minimised in a magnetically geared apparatus. Magnetically geared apparatuses are therefore more energy-efficient than their mechanical counterparts. Two examples of such a magnetically geared apparatus are shown in FIGS. 1*a* to 2*b*.

FIGS. 1*a* and 1*b* show a magnetically geared apparatus 100 which includes an outer stator 102, a first (inner) rotor 104, and a second (intermediate) rotor 106 positioned radially between the stator 102 and the first rotor 104. The stator 102 comprises a plurality of circumferentially arranged conductive windings 108, the first rotor 104 comprises a plurality of circumferentially arranged permanent magnets 110, and the second rotor 106 comprises plurality of circumferentially arranged unmagnetised ferromagnetic (typically steel) pole pieces 112. The first rotor 104 is connected to an internal combustion engine 114 via an input shaft 118*a*, and the second rotor 106 is connected to an output shaft 118*b* so that the output shaft 118 is driven by the second rotor 106. The first rotor 104, second rotor 106 and stator 102 may be housed within a casing (not shown in FIG. 1). The permanent magnets 110 generate a first magnetic field, and the windings 108 will—when supplied with a current—similarly produce a second magnetic field. The characteristics of the second magnetic field can be controlled by adjusting the current supplied to the windings 108. A consequent magnetic field is produced by the interaction between the first magnetic field and the pole pieces 112. This consequent magnetic field will couple with the second magnetic field produced by the windings 108, to produce torque and a geared interaction between the first and second rotors 104, 106. The apparatus of FIG. 1 is useful as a power split device—for its ability to drive the output shaft 118*b* using the internal combustion engine 114, a battery supplying an electrical input to the windings 108, or a mixture of the two. Moreover, the device of FIGS. 1*a*-1*b* can be used as a geared hybrid transmission, thus dispensing with the need for a conventional mechanical gearbox.

FIGS. 2*a* and 2*b* show a magnetically geared apparatus 200. Like reference numerals are used for components shared with the apparatus 100. As can be seen, the magnetically geared apparatus 200 of FIG. 2 is similar to that of FIGS. 1*a* and 1*b*. However, the stator 102 further includes a plurality of circumferentially arranged second permanent magnets 120 (as distinct from the plurality of first permanent magnets 110). Further, there is no input shaft connected to the first rotor 104. Casing 122 is shown enclosing the stator 102, first rotor 104 and second rotor 106. As with the apparatus 100 of FIGS. 1*a*-1*b*, the second rotor 106 is mechanically coupled to and drives the output shaft 118. The casing 122, stator 102 and first rotor 104 are connected to the output shaft 118 by bearings 124, such that the output shaft 118 is rotatable relative to these components. This arrangement combines the functionality of a magnetic gear and a typical electrical machine by allowing for geared torque transmission in combination with either motoring or generating modes. The first magnetic field is generated by the first permanent magnets 110 on the first rotor 104, and the second magnetic field is generated by the second permanent magnets 120 on the stator 102. The pole pieces 112 regulate the interaction between the first and second magnetic fields. When the windings of the stator are supplied with a three-phase, 120 degree displaced current, a rotating magnetic field is set up in the apparatus 200. This rotating magnetic field may have the same number of pole pairs as the first magnetic field generated by the first permanent magnets 110. The rotating magnetic field and the first magnetic field directly couple with one another, via the pole pieces, such that the rotation of the first rotor 104 and of the second rotor 106 is electromechanically coupled with the current supplied to the windings 108. The second rotor 106 will rotate at a lower speed than the first rotor 104. Therefore, by connecting the output shaft to the second rotor 106 as shown, a highly efficient motor-generator, with very high torque capabilities, is thus realised. Moreover, the device of FIGS. 2*a*-2*b* can be used as a geared motor/generator, thus dispensing with the need for a conventional mechanical gearbox.

As shown in FIGS. 1*b* and 2*b*, fewer first permanent magnets 110 may be included where the magnetically geared apparatus is configured as a high torque motor/generator 200, than when the magnetically geared apparatus is configured as a power split device 100. As the skilled person understands, the specific number of first permanent magnets will depend on the application.

Another example of a magnetically geared apparatus is a magnetic gear. A typical magnetic gear includes an inner rotor comprising a first plurality of permanent magnets; an outer rotor comprising a second plurality of permanent magnets; and a pole piece rotor positioned radially between the first and second rotors and comprising a plurality of pole pieces. The first plurality of permanent magnets produce a first magnetic field, and the second plurality of permanent magnets produce a second magnetic field. The pole pieces modulate the interaction between the first and second magnetic fields, thereby producing a geared interaction between the inner rotor and the outer rotor. The main difference from the arrangement in FIGS. 2A-2B is therefore that no windings are present, and that the second plurality of permanent magnets are mounted on a rotor, rather than a stator. By attaching the inner rotor to a first (e.g. input) shaft, and the outer rotor to a second (e.g. output) shaft, a magnetic gear is thereby produced.

A problem with the magnetically geared apparatus as described in any of the examples of the above paragraphs, however, is that stray magnetic flux can cause unwanted eddy currents to be formed in various conductive components of the apparatus. Such eddy currents cause energy loss due to Ohmic heating, which in turn reduces efficiency. This problem is exacerbated in large torque applications, in which the magnetic fields involved are substantial and thus more prone to straying into unwanted components of the apparatus. Moreover, because weight and size reductions are desired, there is a drive towards more compact magnetically geared apparatus designs. Increasing compactness also beneficially increases structural rigidity. However, increasing compactness also exacerbates the problem of stray flux, because of reduced separation between components of the apparatus. There is accordingly a need to effectively control stray magnetic flux within such magnetically geared apparatuses.

SUMMARY

In a first aspect there is provided a magnetically geared apparatus comprising:

- a first mover comprising a plurality of first permanent magnets;
- a stator;
- a second mover; and
- a flux shield aligned with the first plurality of permanent magnets for attenuating magnetic flux,
- wherein one of the stator and the second mover comprises a plurality of pole pieces and is positioned between the first mover and the other of the stator and the second mover; and
- wherein the first mover, the stator and the second mover are aligned in a first direction, and wherein the flux shield is spaced from the plurality of first permanent magnets in a second direction perpendicular to the first direction by a non-magnetic region, thereby attenuating magnetic flux in the second direction.

The other of the stator and the second mover may comprise a plurality of second permanent magnets. In this case, the apparatus may comprise a magnetic gear.

The stator may comprise a plurality of windings and optionally also a plurality of second permanent magnets. In such examples, the second mover may comprise the pole pieces and may be positioned between the stator and the first mover. Where the stator comprises both the plurality of windings and the plurality of second permanent magnets, the apparatus may comprise a motor/generator. Where the stator comprises only the plurality of windings, the apparatus may comprise a power split device. Where the stator comprises a plurality of permanent magnets and a plurality of windings, the plurality of second permanent magnets may be arranged between the windings and the second mover.

As the reader will understand, a mover can be either a rotor, or a translator. That is, a mover can either rotate relative to the stator, or translate substantially axially relative to the stator. As the reader will understand from reading the following description sections and the accompanying figures, the present invention is applicable to radially-arranged and axially-arranged magnetically geared apparatus (in which the movers comprise rotors), and to linearly-arranged magnetically geared apparatus (in which the movers comprise translators). In the following description, we generally use the word "rotor" for simplicity and consistency. However, as the reader will understand, translators can equivalently be used in place of rotors (and vice versa), and thus the concepts disclosed herein apply equally to either type of mover.

In a second aspect, there is provided a rotor for a magnetically geared apparatus comprising concentrically arranged magnetically interacting components, the rotor comprising:

- a support structure (e.g. permanent magnet support structure);
- a plurality of permanent magnets (e.g. first permanent magnets) coupled to the support structure; and
- a flux shield coupled to the support structure, the flux shield being axially aligned with the plurality of permanent magnets and further being axially spaced from the plurality of permanent magnets by a non-magnetic region.

In a third aspect, there is provided a rotor for a magnetically geared apparatus comprising axially spaced magnetically interacting components, the rotor comprising:

- a support structure;
- a plurality of permanent magnets coupled to the support structure; and
- a flux shield coupled to the support structure, the flux shield being radially aligned with the plurality of permanent magnets and further being radially spaced from the plurality of permanent magnets by a non-magnetic region.

By including a flux shield as described above, unwanted flux leakage from the first permanent magnets is attenuated and/or redirected so as to avoid unwanted eddy currents in components of the magnetically geared apparatus that are similarly aligned with the first permanent magnets. Ohmic losses are thereby reduced. Moreover, because the flux shield is spaced from the first permanent magnets, magnetic shorting between the first permanent magnets and the flux shield is prevented or reduced. Such shorting would otherwise prevent the flux shield from effectively reducing flux leakage, and may even actively draw flux in the leakage direction thus reducing performance.

Moreover, where the stator, first rotor and second rotor are concentrically arranged (i.e. radially aligned with one another), the flux shield is spaced from the first permanent magnets in the axial direction, so as to attenuate flux in the axial direction and enhance flux in the radial direction. Magnetic coupling between the radially aligned stator, first rotor and second rotor is thereby enhanced, while reducing problematic eddy currents from stray axial flux. Similarly, where the stator, first rotor and second rotor are axially aligned, the flux shield is spaced from the first permanent magnets in the radial direction, so as to attenuate flux in the radial direction and enhance flux in the axial direction. Magnetic coupling between the axially aligned stator, first rotor and second rotor is thereby enhanced, while reducing problematic eddy currents from stray radial flux.

For example, the first direction may be the radial direction (i.e. the stator, first rotor and second rotor may be concentrically arranged), and the second direction may be the axial direction. Alternatively, the first direction may be the axial direction, and the second direction may be the radial direction.

Where a material or region is said to be non-magnetic in the present disclosure, it is to be understood that the material or region is not ferromagnetic. The non-magnetic region may have a magnetic permeability similar to that of air. For example, the non-magnetic region may have a relative magnetic permeability of substantially 1. Accordingly, the non-magnetic region is substantially unmagnetizable. This helps to ensure that the region does not act as a flux path, even when subject to a large external magnetic field (e.g. from the first plurality of permanent magnets).

The non-magnetic region may be electrically insulating (e.g. may comprise an electrical insulator). This may further help to improve energy efficiency, by preventing the formation of lossy eddy currents in the non-magnetic region.

A flux shield may comprise a structure arranged to attenuate and/or redirect magnetic flux (e.g. stray magnetic flux).

The flux shield may comprise a conductor. For example, the flux shield may comprise copper. While copper is a non-magnetic material, it will support eddy currents when subject to a time varying magnetic field (such as a time varying magnetic field caused by the first and second rotors rotating at different speeds from one another). The induced eddy currents will in turn produce their own magnetic field, which will oppose the magnetic field which caused them (according to Lenz' law). In short, the use of a copper flux shield will attenuate any stray flux from the permanent magnets. Moreover, because copper has a comparatively low electrical resistance, Ohmic losses therein will not be high.

The flux shield may comprise an un-magnetised magnetisable (e.g. unmagnetised ferromagnetic) material. For example, the flux shield may comprise steel. Where the flux shield comprises an un-magnetised magnetisable material, it may be laminated in one of the circumferential, the radial, and the axial direction. Additionally, or alternatively, it may comprise a soft magnetic composite "SMC". SMC comprises a ferromagnetic powder embedded in an electrical insulating film. The use of a laminate or SMC may help to reduce eddy currents in the flux shield, which would otherwise lead to problematic ohmic losses.

Where the flux shield comprises an un-magnetised magnetisable material, it may be shaped to reduce eddy currents. For example, it may comprise circumferential or radial slits therein. It may have a chamfered or rounded profile in the radial direction. It may have through-holes formed therein.

The flux shield may be electrically insulated from each of the first rotor and the second rotor. That is to say, the flux shield may be attached to one of the first rotor and the second rotor with an insulating material therebetween. The insulating material may, in some examples, comprise a non-conductive adhesive.

The non-magnetic region may comprise an air gap. Alternatively, the non-magnetic region may comprise a spacer, such as glass fibre, carbon fibre, engineering plastic, or wood. All of these materials have a relative magnetic permeability of substantially 1. In some examples, each of the first permanent magnets may be spaced from the flux shield by a respective spacer segment. The provision of a non-magnetic spacer having a magnetic permeability similar to that of air may prevent flux from being drawn in the unwanted stray direction, while at the same time allowing the flux shield to redirect or attenuate any flux that travels in the unwanted stray direction. By using a spacer rather than an air gap, construction may be simplified as the flux shield can be mounted to the spacer.

Each of the first rotor, the stator and the second rotor may be arranged around a shaft (e.g. a rotatable shaft or, where translators are used in lieu of rotors, a translatable shaft). One of the first rotor and the second rotor may be mechanically coupled to the shaft. For example, the one of the first rotor and the second rotor may be configured to drive the shaft. The shaft may be configured to move relative to the stator and the other of the first rotor and the second rotor. For example, stator, and the other of the first rotor and the second rotor may be coupled to the shaft via bearings.

The first rotor, the stator and the second rotor may be substantially concentrically arranged around the rotatable shaft. The second rotor may be rotationally coupled to the rotatable shaft. For example, the second rotor may be configured to drive the rotatable shaft. The rotatable shaft may be configured to rotate relative to the stator and the first rotor. For example, the rotatable shaft may be coupled to the stator and to the first rotor via bearings, such that the shaft can rotate without causing rotation of the stator and first rotor.

Alternatively, the first rotor, the stator and the second rotor may be arranged around the shaft and axially aligned with one another (i.e. aligned in a direction parallel to the rotatable shaft). For example, the stator may be axially spaced from the first rotor, and the second rotor may be positioned axially between the stator and the first rotor. The second rotor may be rotationally coupled to the rotatable shaft. For example, the second rotor may be configured to drive the rotatable shaft. The rotatable shaft may be coupled to the stator and to the first rotor via bearings, such that the rotatable shaft can rotate without causing rotation of the stator and first rotor.

Alternatively, where the movers of the first aspect comprise translators; the first translator, the stator and the second translator may be arranged around a translatable shaft. For example, the first translator, the stator and the second translator may be substantially concentrically arranged around the translatable shaft. Each of the first translator and the second translator may be translatable relative to the stator. The first translator may be coupled to the translatable shaft, so as to drive translation of the translatable shaft.

Each of the examples above may also comprise a further shaft, wherein the first rotor/translator is fixed to the further shaft so as to drive movement of the further shaft. The further shaft may be configured to move relative to the second rotor/translator and the stator.

The plurality of first permanent magnets may be circumferentially arranged. Similarly, the plurality of pole pieces may be circumferentially arranged. Similarly, the plurality of windings may be circumferentially arranged. Each of the first permanent magnets may occupy a predefined arc length around a perimeter of the first rotor, and the flux shield may be spaced from the first permanent magnets by a distance that is between one tenth and one half of the predefined arc length. The inventors have found that this separation distance may optimise performance and efficiency. If the separation distance were any smaller, flux may be encouraged from the first permanent magnets into the flux shield, reducing machine performance. If the separation distance were any larger, there may only be a small space between the flux shield and the second rotor, causing leakage of flux from the flux shield to the second rotor.

The second rotor may comprise a pole piece support structure mechanically coupled to the rotatable shaft. The pole pieces may be coupled to the pole piece support structure. The pole piece support structure may be a conductor. For example, it may comprise a metal. For example, it may be formed of a metal. The flux shield may be located axially between the plurality of first permanent magnets and the pole piece support structure, to thereby prevent axial flux from leaking into the pole piece support structure. Eddy currents and Ohmic losses in the pole piece structure may thereby be reduced or prevented.

The pole piece support structure may comprise a first support member at a first axial end of the second rotor, optionally a second support member at a second axial end of the second rotor, and optionally a third support member axially between the first and second support members. Each of the support members may comprise a disc connected at its centre to the rotatable shaft, or a plurality of spokes extending radially from the rotatable shaft. The apparatus may comprise a plurality of flux shields, each flux shield being located axially between the first pole pieces and a respective one of the support members.

The apparatus or rotor may comprise a first flux shield axially spaced from a first axial end of the first permanent magnets, and/or may comprise a second flux shield axially spaced from a second axial end of the first permanent magnets. Where the pole piece support structure also comprises the third support member, the apparatus may further comprise a third flux shield axially spaced from a first side of the third support member, and a fourth flux shield axially spaced from a second side of the third support member.

In some examples, each flux shield may be attached a respective one of the support members, so as to be axially aligned with the first permanent magnets and axially spaced from the first permanent magnets. A non-magnetic, electrically insulating spacer may be provided between each flux shield and its respective support member.

The plurality of pole pieces may be coupled to the support member(s) via a non-magnetic (and optionally electrically insulating) pole piece spacer, such that the plurality of pole pieces are axially spaced from the support member(s). Each of the pole pieces may be axially spaced from the support member(s) by respective pole piece spacers. This serves to increase the gap between pole piece and flux shield, increasing the reluctance of the path for flux and thus improving the flux shielding by reducing the flux density of the shield. The non-magnetic pole piece spacer may comprise the same material as the spacer of the first aspect. For example, the non-magnetic pole piece spacer may comprise glass fibre, carbon fibre, engineering plastic, or wood.

Each of the first rotor, the stator and the second rotor may be housed within a casing. The casing may be metal, for example steel or aluminium. The flux shield may be located axially between the plurality of first permanent magnets and the casing. Accordingly, eddy currents—and hence Ohmic losses—in the casing may thereby be reduced or prevented.

The first rotor may comprise a permanent magnet support structure. The first permanent magnets may be coupled to the permanent magnet support structure. The flux shield may be coupled to the permanent magnet support structure. For example, the flux shield may be coupled to the permanent magnet support structure with the non-magnetic region therebetween.

The flux shield may be arranged to coincide with the axial flux leakage path from the first permanent magnets. For example, it may be arranged to at least partially surround a radially outer edge of the spacer.

The flux shield may comprise an annular ring arranged to axially align with the plurality of first permanent magnets. The flux shield may comprise a plurality of circumferential segments arranged to form the annular ring. The circumferential segments may be circumferentially spaced from one another, for example by a small air gap. Accordingly, eddy currents may be further reduced.

The stator may further comprise a second plurality of permanent magnets arranged between the windings and the second rotor. The second plurality of permanent magnets may be mounted to the stator, for example an inner surface of the stator.

The flux shield may comprise a chamfered radially inner surface and a chamfered radially outer surface. Alternatively, the flux shield may have a rounded cross-sectional profile. In some examples, the flux shield may at least partially extend along a radially outer edge of the spacer. These arrangements may help to further redirect axial stray flux back to the first permanent magnets and pole pieces, thereby reducing Ohmic losses.

The first permanent magnets may be chamfered, such that each of the first permanent magnets is axially shorter at its radially outer edge than at its radially inner edge. The pole pieces may be chamfered such that each of the first permanent magnets is axially shorter at its radially inner edge than at its radially outer edge. This may help to increase the reluctance of the flux path between the radially outer edges of the first permanent magnets and the radially outer edges of the pole pieces, which may in time help to reduce axial stray flux.

Also disclosed herein is a magnetically geared apparatus comprising:

- a first rotor comprising a plurality of first permanent magnets;
- a stator; and
- a second rotor positioned between the first rotor and the stator, the second rotor comprising a pole piece support structure, the pole piece support structure comprising wall regions and a pole piece region, and a plurality of pole pieces coupled to the pole piece region;
- wherein the first rotor, the stator and the second rotor are concentrically arranged around a shaft, and wherein at least one wall region of the piece support structure is axially spaced from the plurality of first permanent magnets so as to minimise axial flux leakage into the at least one wall region from the plurality of first permanent magnets.

The pole piece support structure may be axially spaced from the plurality of first permanent magnets by an air gap.

Where each of the first permanent magnets occupies a predefined arc length around a perimeter of the first rotor, the flux shield may be spaced from the first permanent magnets by a distance that is between one tenth and one half of the predefined arc length.

BRIEF DESCRIPTION OF THE DRAWINGS

Like reference numerals are used for like components in the drawings.

DETAILED DESCRIPTION

Figure 1A:
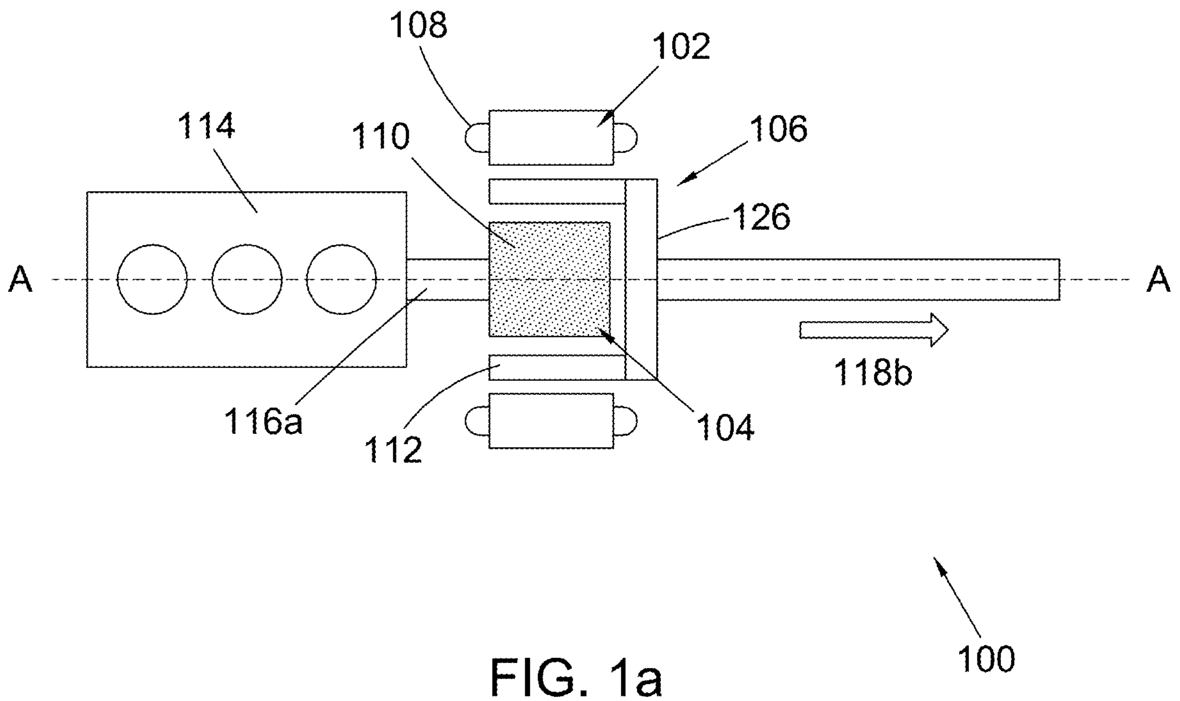
FIG. 1*a* schematically illustrates a first magnetically geared apparatus according to the prior art.
Figure 2A:
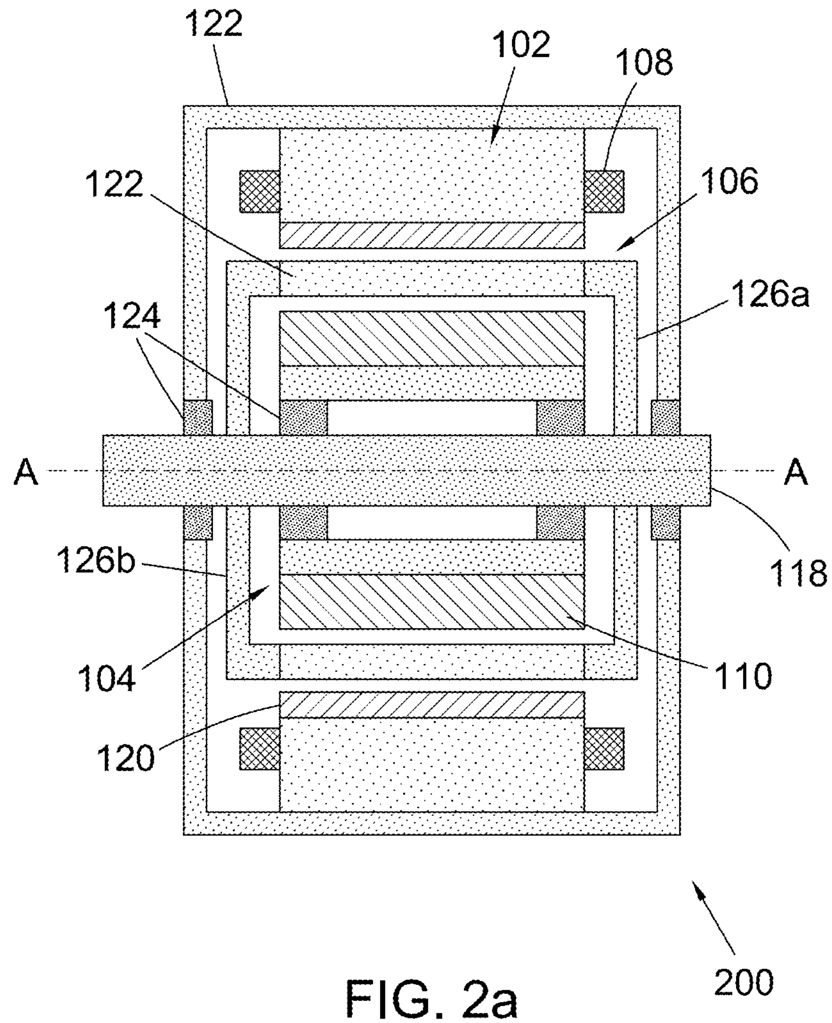
FIG. 2*a* schematically illustrates a second magnetically geared apparatus according to the prior art.

Herein, the axial direction refers to the direction A-A shown in FIGS. 1*a* and 2*a*. Where two components are said to be axially aligned, they are aligned with one another in a direction parallel to the axis A-A. Similarly, where two components are said to be axially spaced from one another, there exists a gap between them in a direction parallel to the axis A-A. The radial direction is defined as being perpendicular to the axis A-A. The circumferential direction is defined as being concentric to the axis A-A.

Referring to FIG. 1*a,* the second rotor 106 of the first magnetically geared apparatus 100 has an "open cup" configuration, in which the pole pieces 112 are supported by a pole piece support structure which includes a single steel support member 126 at a first axial end of the pole pieces 112. No support member is present at the second axial end of the pole pieces 112. Steel is used as the support member for its high stiffness, thereby preventing deformation of the second rotor 106.

By contrast, we see with reference to FIG. 2*a* that the second rotor 106 of the second magnetically geared apparatus 200 has a "closed cup" configuration, in which the pole pieces 112 are supported by a pole piece support structure that includes a first steel support member 126*a* (sometimes referred to herein as a wall region) at a first axial end of the pole pieces 112, and a second steel support member 126*b* (also sometimes referred to herein as a wall region) at a second axial end of the pole pieces 112. A pole piece region, comprising the pole pieces 112, is defined between the wall regions. Also shown in FIG. 2*a* is aluminium casing 122. The stator 102 is mounted to an inner surface of the casing 122. The casing 122 conceals the moving components of the apparatus 200. Aluminium is lightweight and durable, and thus a suitable casing material.

As the reader will understand, the first magnetically geared apparatus 100 could have a closed cup configuration as shown in FIG. 2*a*, and the second magnetically geared apparatus 200 could have an open cup configuration as shown in FIG. 1*a*. Furthermore, although not shown in FIG. 1*a,* the apparatus 100 may also include an aluminium casing 122.

As the reader will understand, by replacing the stator with a further rotor comprising the second plurality of permanent magnets 120, and dispensing with the windings, a magnetic gear is formed, that does not include windings, with a fixed gear ratio. This applies also to FIGS. 4-7, for example.

The inventors have found that magnetic flux can stray axially from the axial ends of the first permanent magnets 110, and into the steel support member(s) 126 and the casing 122. When this happens, eddy currents are induced in these components, which in turn leads to Ohmic losses in the first magnetically geared apparatus 100 and in the second magnetically geared apparatus 200. The steel support member(s) could be milled, drilled or shaped to reduce eddy currents. However, doing so would negatively affect the structural rigidity and robustness of the support member(s). Although steel is mentioned as the metal of choice throughout, other metals may be used and the features disclosed herein are appropriate for use in any magnetically geared apparatus in which eddy currents may be induced unintentionally due to stray axial flux.

The present disclosure addresses this problem of stray axial flux. In each of FIGS. 3*a* to 12, a magnetically geared apparatus according to the present disclosure is shown, in which a flux shield is arranged to prevent or reduce stray axial flux from giving rise to eddy currents in the steel support member(s) 126 or aluminium casing 122. In FIG. 13, a rotor according to the present disclosure is disclosed, for use as the first rotor 104 in the first magnetically geared apparatus, or as the first rotor 104 in the second magnetically geared apparatus. As the reader will understand, the principles disclosed in this document can be applied to magnetic gears (see, for example, FIGS. 21-24 below), to magnetic motor/generators (see, for example, FIGS. 4-7 and 17-20 below), and to magnetic power split devices (see, for example, FIGS. 3*a*, 3*b* below).

Figure 1B:
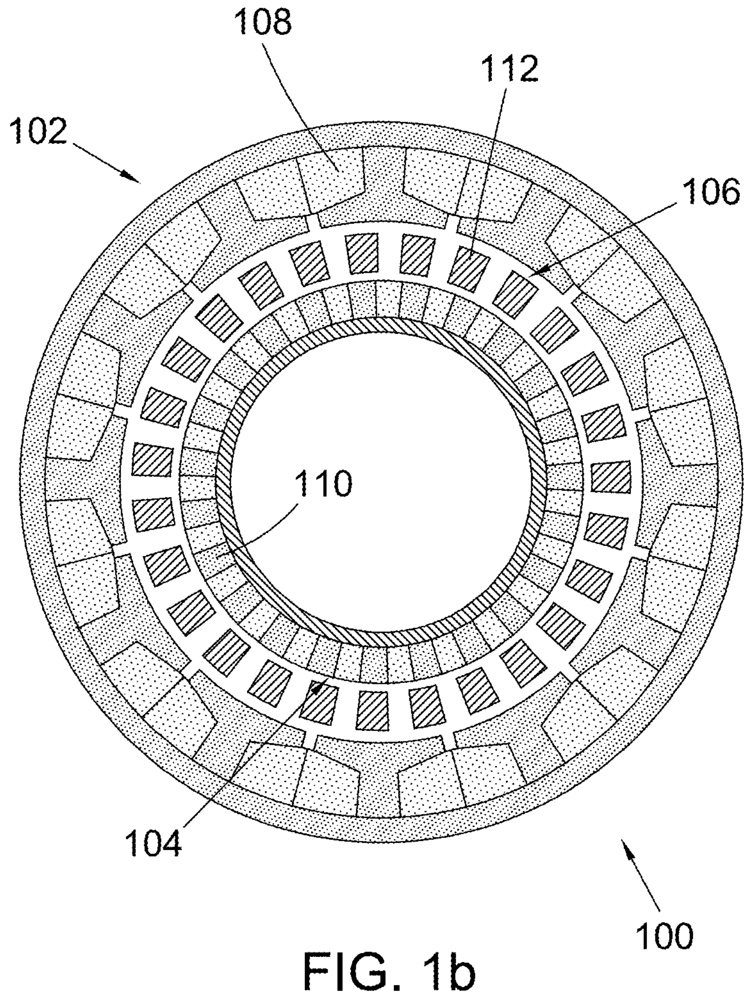
FIG. 1*b* shows the magnetically geared apparatus according to FIG. 1*a,* viewed along the axial direction A-A.
Figure 2B:
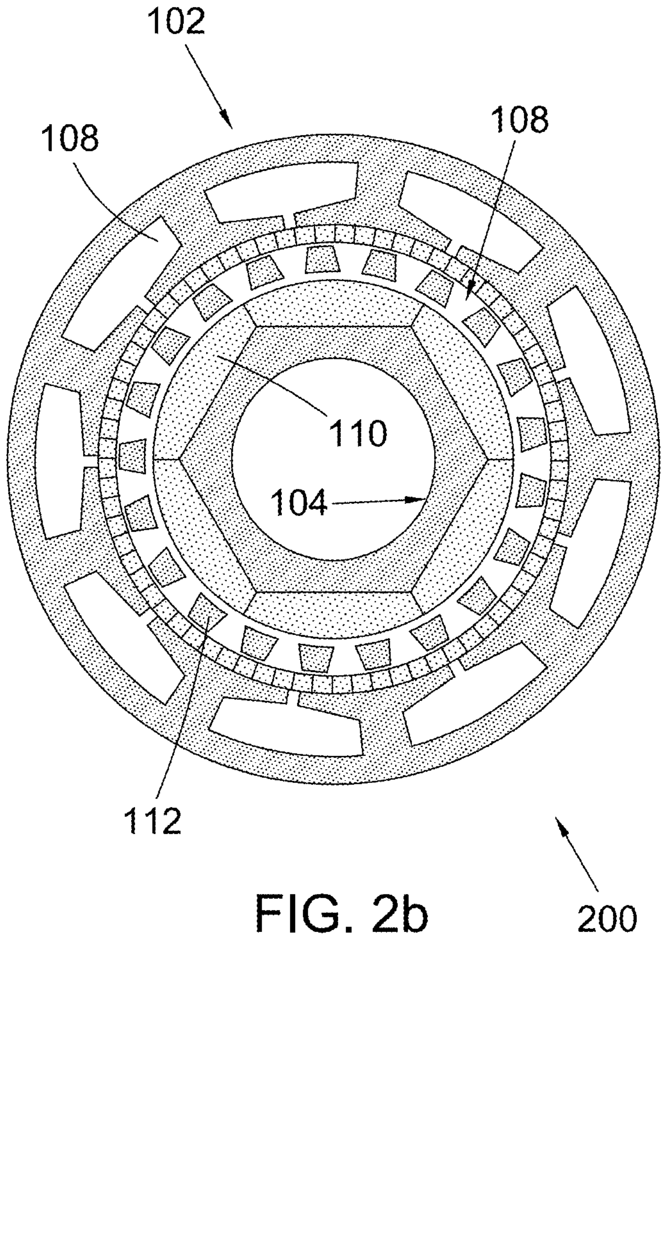
FIG. 2*b* shows the magnetically geared apparatus according to FIG. 2*a*, viewed along the axial direction A-A.

In each of the examples below, the flux shield may be attached to the apparatus by adhesive, bolts, rivets or clips, or indeed using any other fixing means. As the reader will understand, the flux shield in each of the examples below could be used in combination with a first magnetically geared apparatus 100 according to FIGS. 1*a*-1*b,* or in combination with a second magnetically geared apparatus according to FIGS. 2*a*-2*b,* in order to improve performance and efficiency. As is described in more detail below, the (or each) flux shield is spaced from the first permanent magnets by a non-magnetic, electrically insulating region. The non-magnetic, electrically insulating region may be a spacer component (see, for example, the spacers 304*a,* 304*b* of FIG. 3*a*). Alternatively, it may be an airgap (see, for example, FIG. 6).

In the examples below, the flux shield is formed of an un-magnetised soft magnetic composite material. However, in some examples, it may be formed of laminated steel sheets. In other examples, it may be formed of copper.

Figure 3A:
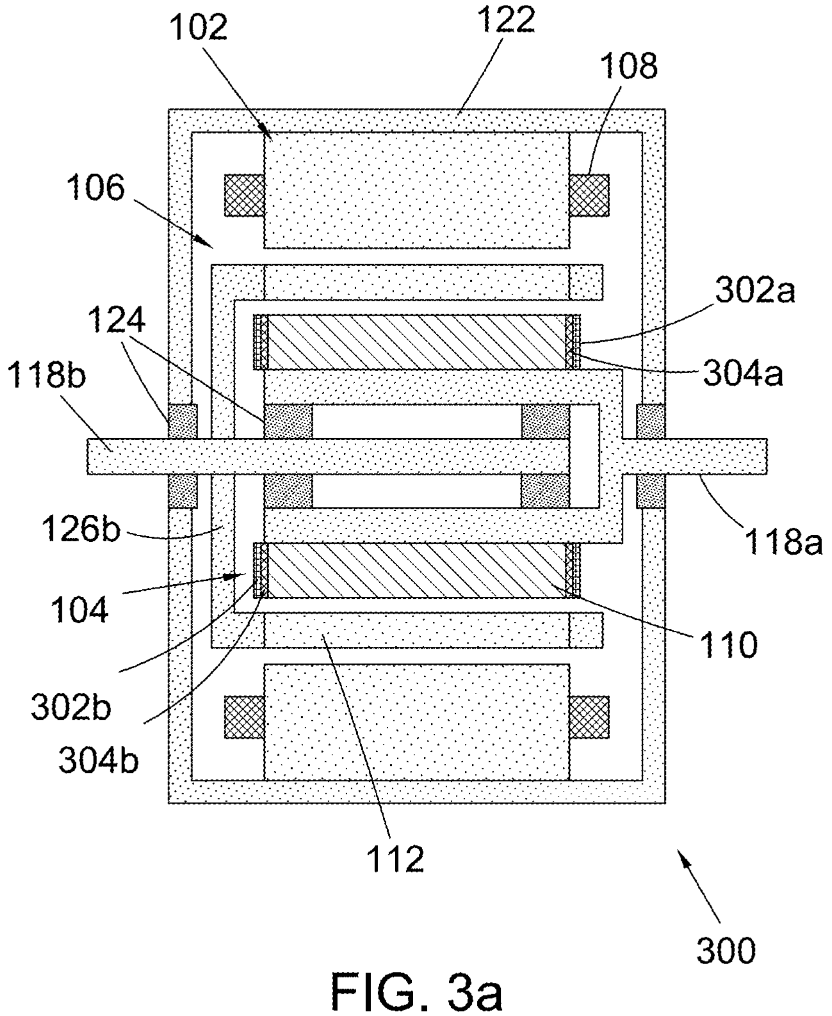
FIG. 3*a* shows a second magnetically geared apparatus according to the present disclosure.

FIG. 3*a* shows a third magnetically geared apparatus 300, according to the present disclosure. The magnetically geared apparatus 300 includes only a first plurality of permanent magnets 110. That is to say, it does not include a second plurality of permanent magnets coupled to the stator. Therefore, it is particularly suited for use as a power split device, similar to FIGS. 1*a*-1*b*. The third magnetically geared apparatus 300 includes a first annular magnetic flux shield 302*a* at a first axial end of the first rotor 104, and a second annular magnetic flux shield 302*b* at a second axial end of the first rotor 104. Each of the flux shields 302*a*, 302*b* is axially aligned with the first permanent magnets 110, and spaced apart from the first permanent magnets 110 by a respective annular spacer 304*a*, 304*b*. That is to say, each spacer 304*a*/304*b* is interposed between an axial end of the first permanent magnets 110 and a respective magnetic flux shield 302*a*/302*b*. In an alternative example, each flux shield 302*a*/302*b* may be spaced apart from a respective axial end of the first permanent magnets 110 by a respective air gap instead of or in addition to a spacer.

Due to the positioning and material of the flux shields 302*a*, 302*b*, the flux shields 302*a*, 302*b* reduce or substantially prevent stray axial flux lines from the first permanent magnets 110 from reaching the steel support member 126, and further reduce or substantially prevent stray axial flux lines from reaching the metal casing 122.

Labelled on FIG. 3*a* are the radial direction R, and the axial direction A. The radial direction R is perpendicular to the axial direction A. As can be seen, the stator 102, first rotor 104, and second rotor 106 are concentrically arranged. That is to say, they are aligned in the radial direction. The flux shield 302*a*, on the other hand, is aligned with the first permanent magnets 110 in the axial direction, and is spaced from the first permanent magnets 110 in the axial direction. Accordingly, the flux shield 302*a* attenuates flux straying in the axial direction, and encourages flux to propagate in the radial direction—i.e. radially towards the pole pieces 112 and the stator 102.

Also shown in FIG. 3*a* are an input shaft 118*a* and an output shaft 118*b*. The input shaft 118*a* is mechanically coupled to the first rotor 104, such that the input shaft 118*a* drives the first rotor 104. The output shaft 118*b* is mechanically coupled to the second rotor 106, such that the second rotor drives the output shaft 118*b*. The input shaft 118*a* extends from a first axial end of the magnetically geared apparatus 300, while the output shaft 118*b* extends from a second axial end of the magnetically geared apparatus 300. The second rotor 106 has an open cup structure, and is open at its first axial end in order to accommodate the input shaft 118*a*. The first rotor 104 also has an open cup structure, and is open at its second axial end in order to accommodate the output shaft 118*b*. The input shaft 118*a* is coupled to the casing 122 via bearings 124. The output shaft 118*b* is coupled to the casing 122 and to the first rotor 104 via bearings 124. The first rotor 104 is the radially inner-most rotor. The second rotor 106 is arranged radially between the first rotor 104 and the stator 102.

Because the second rotor 106 has an open structure and is open at its first axial end, it includes only a single (second) steel support member 126*b*. It is this arrangement which defines the open cup structure. Because of this open cup structure, the first flux shield 302*a* at the first axial end of the first permanent magnets 110 acts to prevent stray axial flux from reaching the casing 122. The second flux shield 302*b* acts to prevent stray axial flux from reaching the steel support member 126*b*. In some examples, where there is a sufficiently large gap between the first permanent magnets 110 and the casing 122 at the first axial end of the apparatus (i.e. the end that is distal from the steel support member 126*b*), the first flux shield 302*a* may be dispensed with.

Figure 3B:
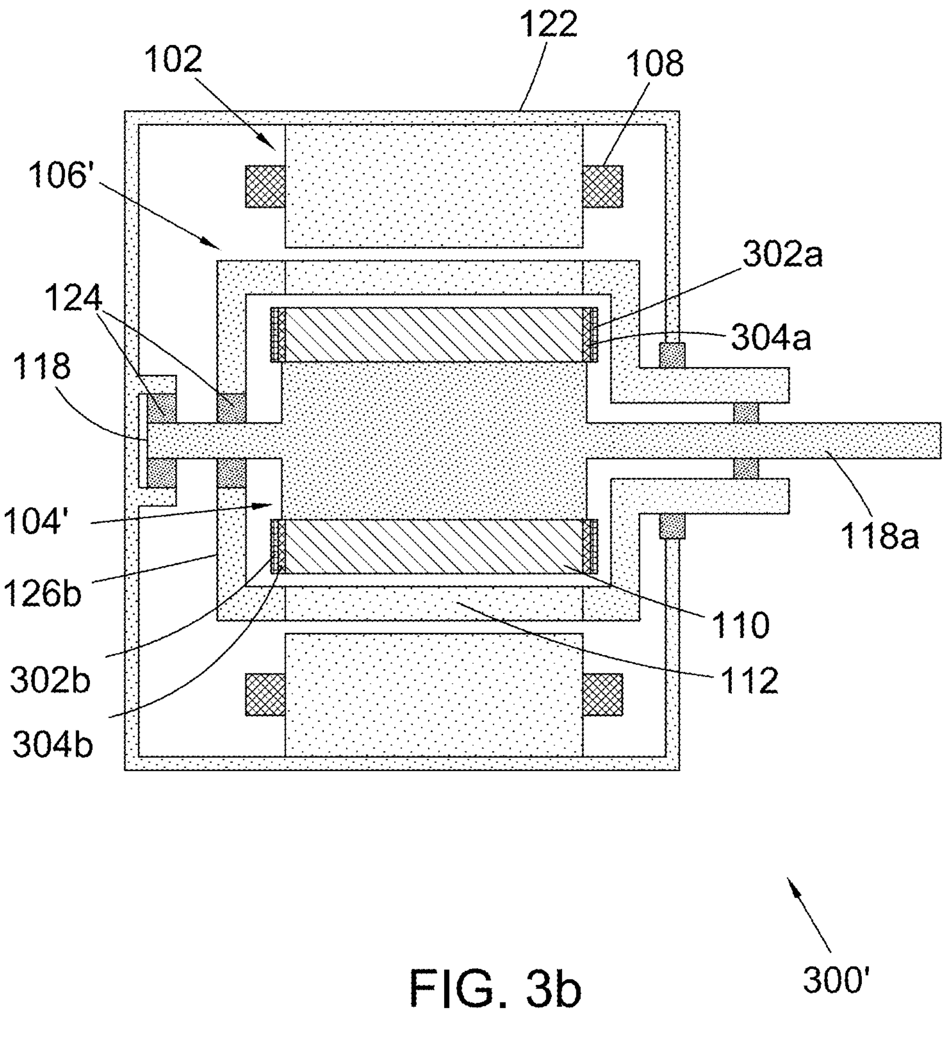
FIG. 3*b* shows a variation of the second magnetically geared apparatus according to FIG. 3*a;*

FIG. 3*b* shows a variation 300' of the magnetically geared apparatus 300 shown in FIG. 3*a*. Similarly to FIG. 3*a*, the magnetically geared apparatus 300' of FIG. 3*b* comprises an input shaft 118*a* and an output shaft 118*b*. The input shaft 118*a* is mechanically coupled to the first rotor 104', such that the input shaft 118*a* drives the first rotor 104'. The output shaft 118*b* is mechanically coupled to the second rotor 106', such that the second rotor 106' drives the output shaft 118*b*. In fact, the output shaft 118*b* comprises a hollow shaft 118*b* which is directly coupled to the first steel support member 126*a*. Both the input shaft 118*a* and the output shaft 118*b* extend from the same (first) axial end of the magnetically geared apparatus 300', and are concentric with one another. The input shaft 118*a* is arranged concentrically within the hollow output shaft 118*b*. The input shaft 118*a* is coupled to the casing 122 and to the second rotor 106' via bearings. The output shaft 118*b* is coupled to the casing 122 and to the first rotor 104' via bearings.

Figure 4:
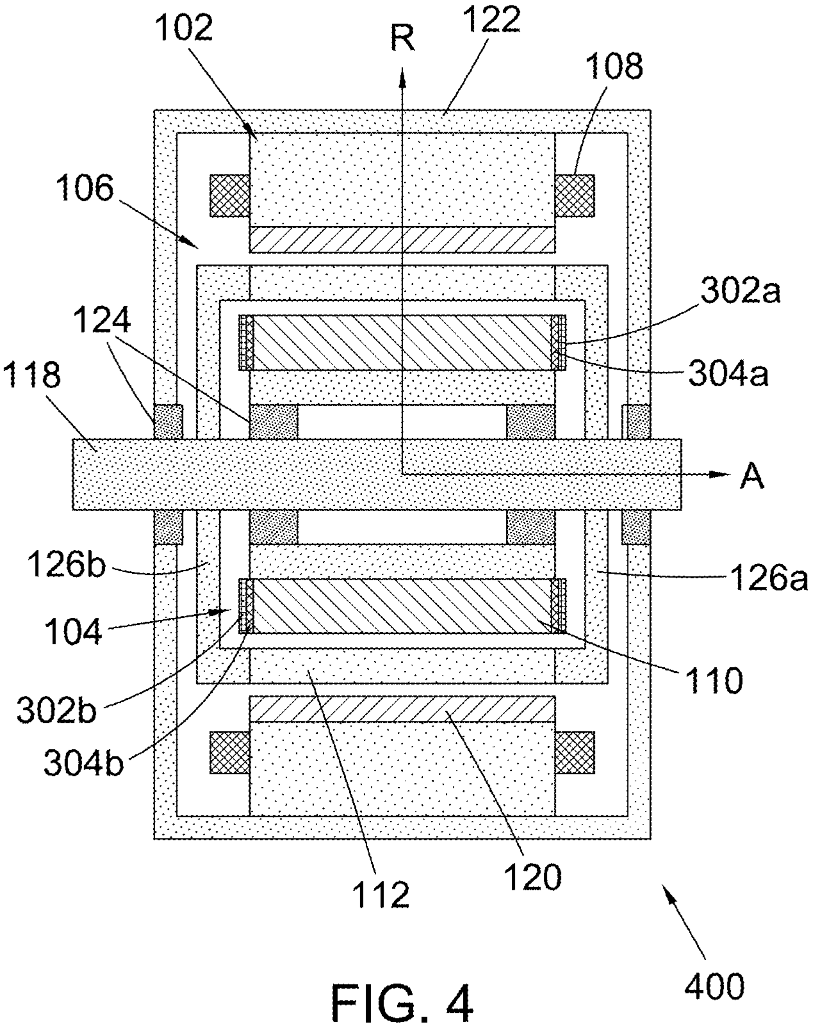
FIG. 4 shows a third magnetically geared apparatus according to the present disclosure.

FIG. 4 shows a fourth magnetically geared apparatus 400, according to the present disclosure. The magnetically geared apparatus 400 includes both a first plurality of permanent magnets 110, and a second plurality of permanent magnets 120. Therefore, it is particularly suited for use as a high-torque motor/generator, similar to FIGS. 2*a*-2*b*. The fourth magnetically geared apparatus 400 includes the same flux shields 302*a*, 302*b* and spacers 304*a*, 304*b* as are included in the third magnetically geared apparatus 300. The flux shields 302*a*, 302*b* of FIG. 4 provide the same benefits as those of FIGS. 3*a*-3*b*.

Figure 5:
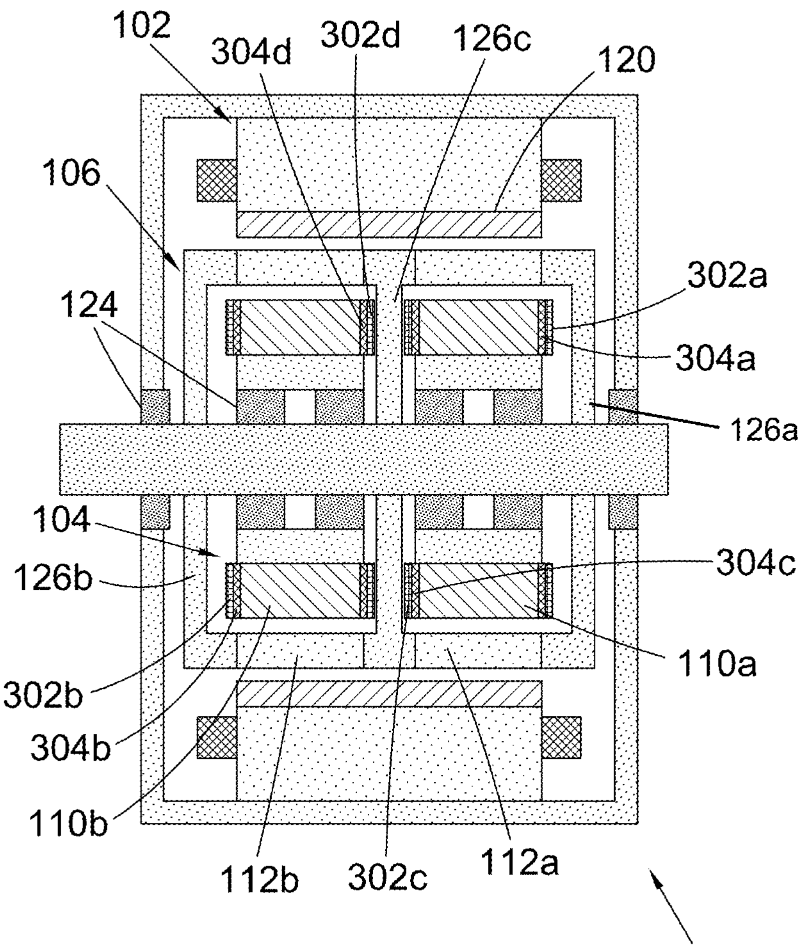
FIG. 5 shows a fourth magnetically geared apparatus according to the present disclosure.

FIG. 5 shows a fifth magnetically geared apparatus 500, according to the present disclosure. The fifth magnetically geared apparatus 500 is similar to the fourth magnetically geared apparatus 400 of FIG. 4, however the first plurality of permanent magnets 110 is split into two sub-pluralities of permanent magnets. Second rotor 106 is accordingly divided into two halves and comprises a first plurality of pole pieces 112*a* at a first half thereof, and a second plurality of pole pieces 112*b* at a second half thereof. Further, the second rotor 106 comprises a first steel support member 126*a* at the first axial end of the first half, a second steel support member 126*b* at the second axial end of the second half, and a third steel support member 126*c* axially between the first and second support members 126*a*, 126*b*. The third steel support member 126*c* is interposed between the first plurality of pole pieces 112*a* and the second plurality of pole pieces 112*b*. Furthermore, the plurality of first permanent magnets 110 comprises a first sub-plurality of the first permanent magnets 110*a* at a first half of the first rotor 104, and a second sub-plurality of the first permanent magnets 110*b* at a second half of the first rotor 104. The first plurality of pole pieces 112*a* of the second rotor 106 corresponds to (is radially aligned with) the first sub-plurality of permanent magnets 110*a* of the first rotor 104, and similarly the second plurality of pole pieces 112*b* of the second rotor 106 corresponds to (is radially aligned with) the second sub-plurality of permanent magnets 110*b* of the first rotor 104.

The first rotor 104 comprises a first annular flux shield 302*a* axially spaced from a first axial end of the first sub-plurality of permanent magnets 110*a* by a first spacer 304*a*; a second annular flux shield 302*b* axially spaced from a second axial end of the second sub-plurality of permanent magnets 110*b* by a second spacer 304*b*; a third annular flux shield 302*c* axially spaced from the second axial end of the first sub-plurality of first permanent magnets 110*a* by a third spacer 304*c*; and a fourth annular flux shield 302*d* axially spaced from the first axial end of the second sub-plurality of first permanent magnets 110*b* by a fourth spacer 304*d*.

Accordingly, the third and fourth axial flux shields 302*c*, 302*d* reduce or substantially prevent axial flux from leaking into the third steel support member 126*c*, while the first axial flux shield 302*a* reduces or substantially prevents leakage into the first steel support member 126*a*, and the second axial flux shield 302*b* reduces or substantially prevents leakage into the second steel support member 126*b*.

Figure 6:
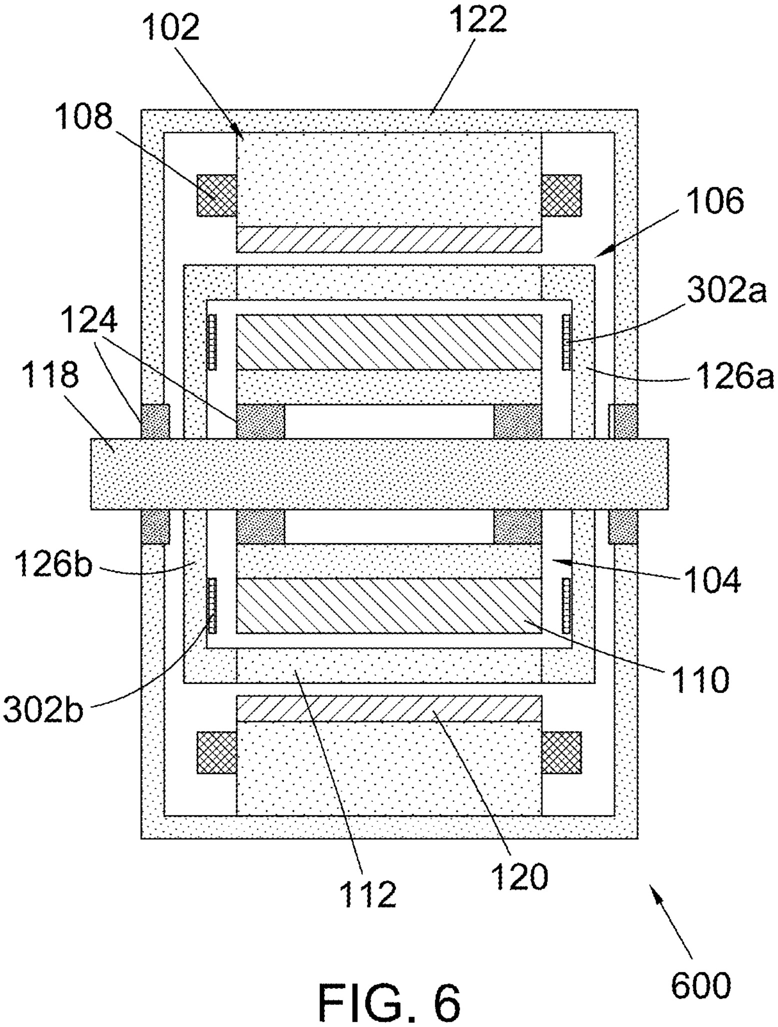
FIG. 6 shows a fifth magnetically geared apparatus according to the present disclosure.

FIG. 6 shows a sixth magnetically geared apparatus 600, according to the present disclosure. The sixth magnetically geared apparatus 600 is similar to the fourth magnetically geared apparatus 400, with the spacers 304*a*, 304*b* absent. The sixth magnetically geared apparatus 600 therefore includes a first annular magnetic flux shield 302*a* aligned with and axially spaced from a first axial end of the plurality of first permanent magnets 110, and a second annular magnetic flux shield 302*b* aligned with and axially spaced from a second axial end of the plurality of first permanent magnets 110. However, in contrast with earlier examples, the spacing between the plurality of first permanent magnets 110 and each of the flux shields 302*a*, 302*b* instead comprises an air gap. In particular, instead of being attached to the first rotor 104, each of the flux shields 302*a*, 302*b* is attached to an inner surface of respective one of the first and second support members 126*a*, 126*b*, and is axially spaced from the plurality of first permanent magnets 110 by an air gap. Therefore, it can be seen that spacers are not necessarily required, as long as a non-magnetic and electrically insulating region is provided between the axial ends of the plurality of permanent magnets and the respective flux shields. This region may be provided by a spacer, as previously described, by an air gap, or by a combination of the two.

Figure 7:
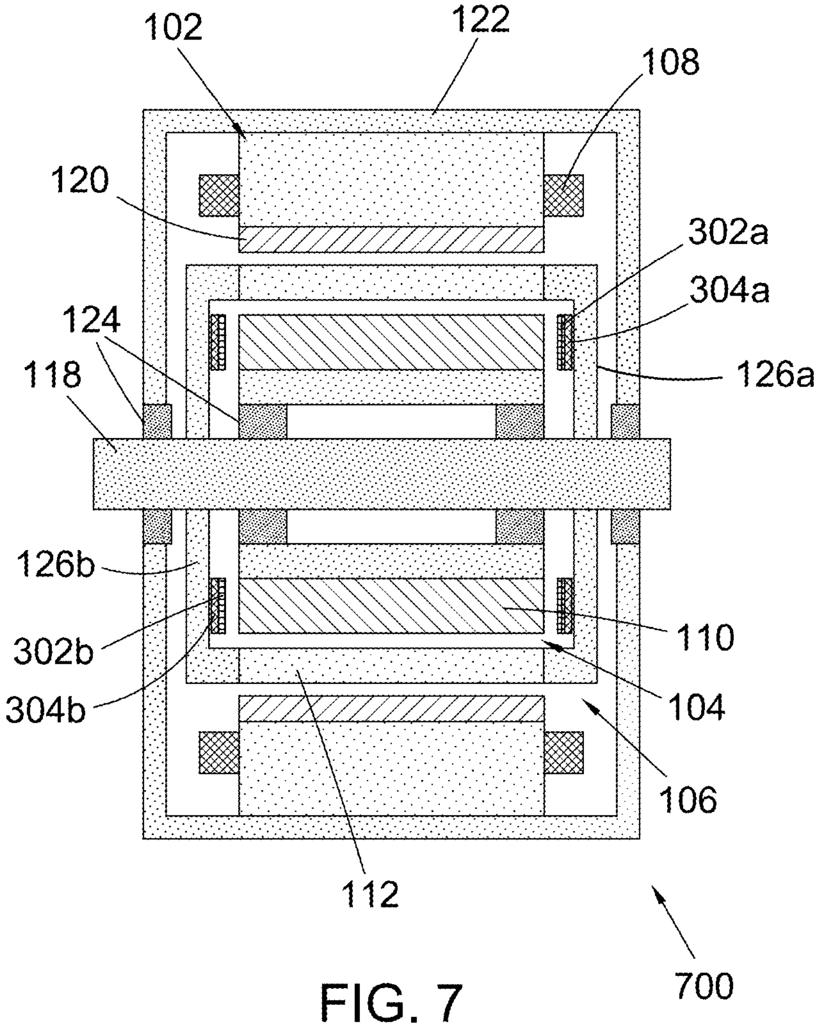
FIG. 7 shows a sixth magnetically geared apparatus according to the present disclosure.

FIG. 7 shows a seventh magnetically geared apparatus, according to the present disclosure. The seventh magnetically geared apparatus 700 represents a slight variation of the magnetically geared apparatus 600 of FIG. 6. In particular, the first magnetic flux shield 302*a* in the seventh magnetically geared apparatus 700 is attached to the first support member 126*a* with a first spacer 304*a* therebetween; and the second magnetic flux spacer 302*b* in the seventh magnetically geared apparatus 700 is attached to the second support member 126*b* with a second spacer 304*b* therebetween. Accordingly, the first magnetic flux shield 302*a* is axially spaced from the plurality of first permanent magnets 110 by an electrically insulating region comprising an air gap, and from the first support member 126*a* by the first spacer 304*a*. Similarly, the second magnetic flux shield 302*b* is axially spaced from the plurality of first permanent magnets 110 by electrically insulating region comprising an air gap, and from the second support member 126*b* by the second spacer 304*b*.

Figure 8A:
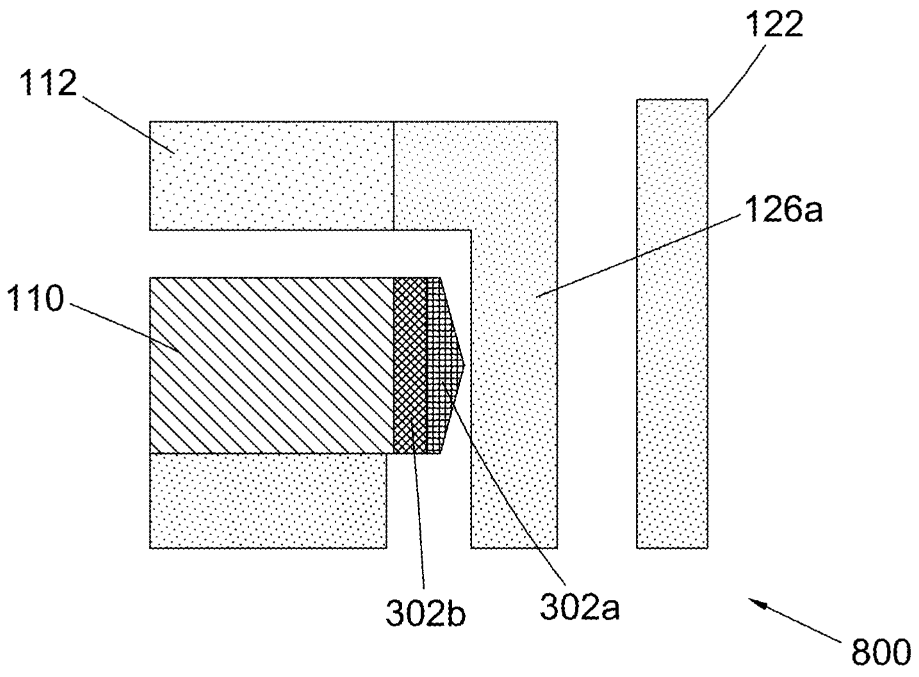
FIG. 8*a* shows a seventh magnetically geared apparatus according to the present disclosure.
Figure 8B:
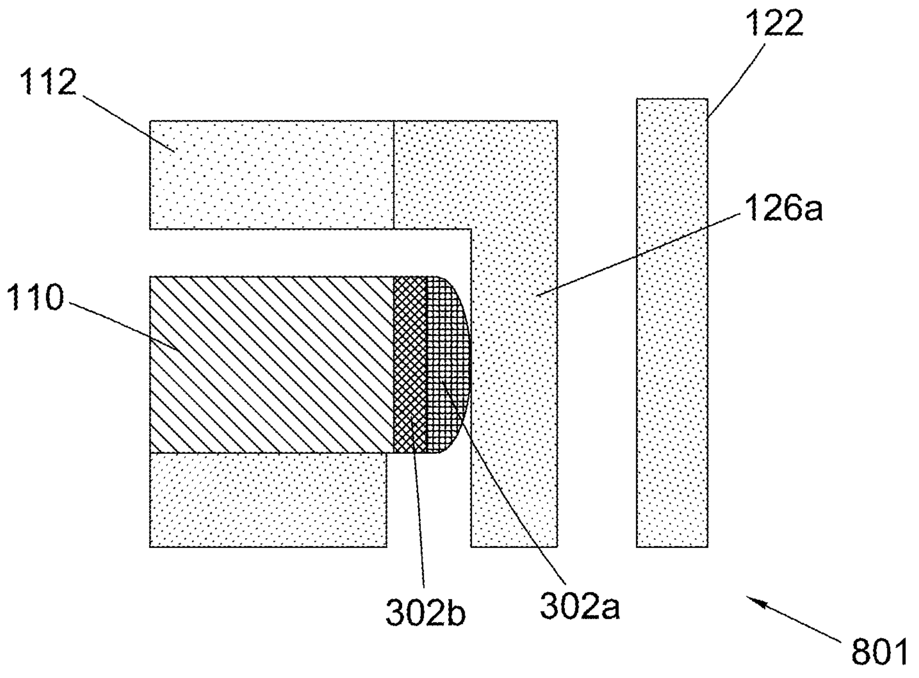
FIG. 8*b* shows a variation of the magnetically geared apparatus of FIG. 8*a;*
Figure 9:
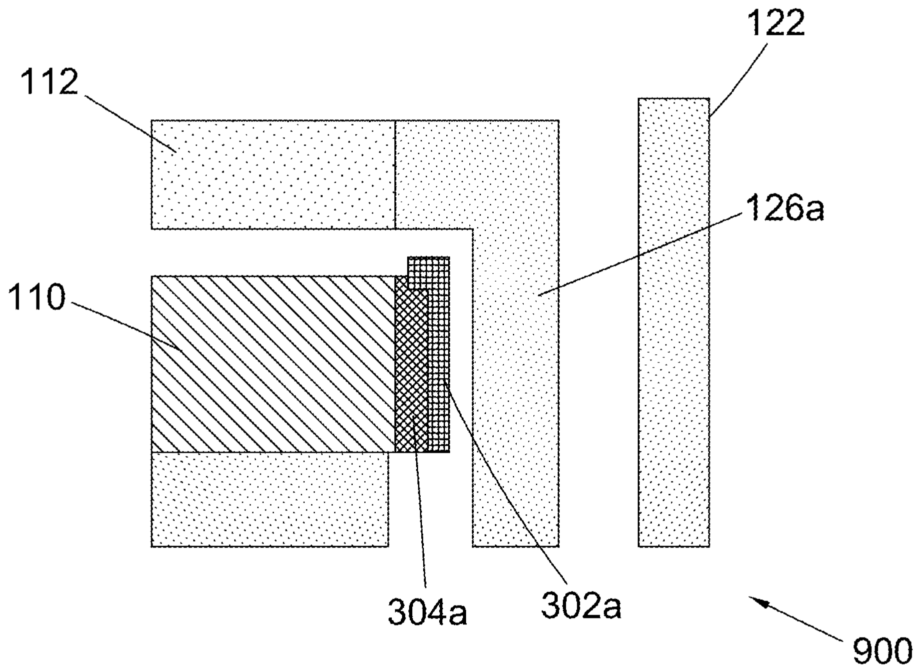
FIG. 9 shows an eighth magnetically geared apparatus according to the present disclosure.

As shown in FIGS. 3*a* to 7, the flux shields 302 may have a rectangular cross-sectional profile. However, as shown in FIGS. 8*a*, 8*b* and 9, the flux shields 302 could have a non-rectangular cross-sectional profile. Two such non-rectangular cross-sectional profiles are shown in FIGS. 8*a*, 8*b* and 9.

The first magnetic flux shield 302*a* in the magnetically geared apparatus 800 of FIG. 8*a* has substantially triangular cross-section, specifically a chamfered radially inner edge and a chamfered radially outer edge, such that the first flux shield 302*a* is thickest at a radial centre of its cross-section. In other examples, the first magnetic flux shield 302*a* may have a rounded cross-sectional profile. For example, in the magnetically geared apparatus 801 of FIG. 8*b*, the first magnetic flux shield 302*a* may be shaped as a curved segment, such that the flux shield 302*a* is thickest at a radial centre of its cross-section. The specific cross-sectional profile may be selected according to the path of the flux leakage in the magnetically geared apparatus in question. A chamfered cross-sectional profile as shown in FIG. 8*a*, or a rounded cross-sectional profile as shown in FIG. 8*b*, may be particularly useful for a magnetically geared apparatus in which a majority of the axial stray flux extends from a radial midpoint of each of the first permanent magnets 110. In such examples, the chamfered or rounded profile further helps to reduce or substantially prevent eddy currents, and hence Ohmic losses, in the pole piece support members.

In yet other examples, the flux shield may include slits, holes, pockets, and/or grooves formed therein. The slits may be formed in the radial and/or circumferential direction. Such features may help to reduce eddy currents, and hence Ohmic losses, in the flux shield itself. More on this in FIGS. 16*d*-16*d* below.

FIG. 9 shows a partial view of a ninth magnetically geared apparatus 900, according to the present disclosure. In the magnetically geared apparatus 900 of FIG. 9, the first magnetic flux shield 302*a* extends partially along a radially outer edge of the first spacer 304*a*. Accordingly, at least some stray flux lines extending from the radially outer edge of the plurality of first permanent magnets 110 are caught by the flux shield.

While FIGS. 8*a*, 8*b* and 9 do not show the second axial end of the magnetically geared apparatus 800, 900, the reader will understand that the magnetically geared apparatus in each of these examples may include a second magnetic flux shield 302*b* and second spacer 304*b*, as in previous examples. The second magnetic flux shield 302*b* and second spacer 304*b* in each example may have the same cross-sectional profile as the first magnetic flux shield 302*a* and first spacer 304*a*, or may have a different cross-sectional profile.

Figure 10:
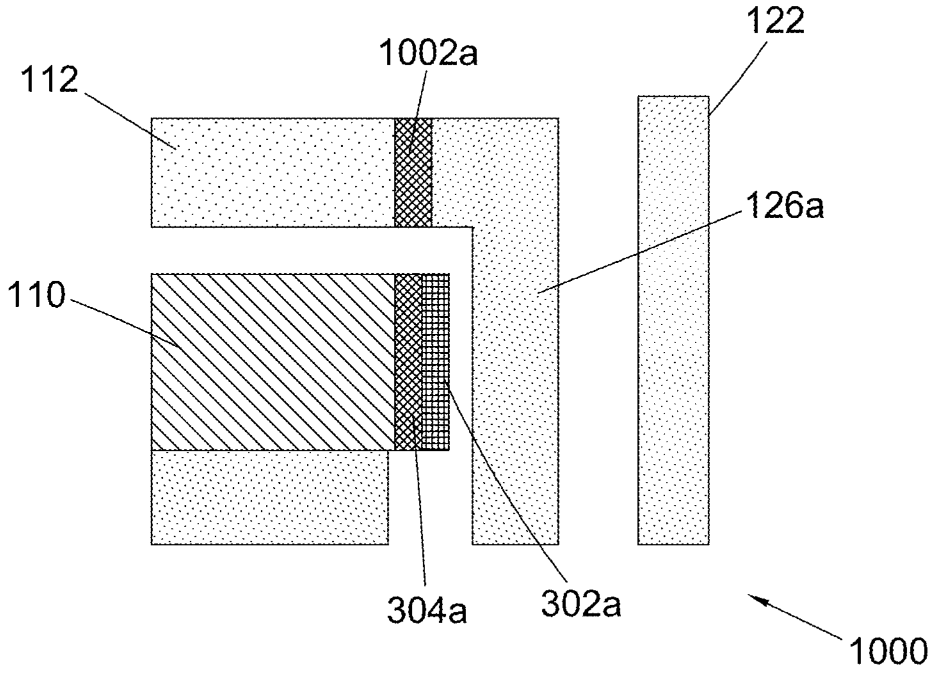
FIG. 10 shows a ninth magnetically geared apparatus according to the present disclosure.

As shown in the tenth magnetically geared apparatus 1000 of FIG. 10, a first non-magnetic, electrically insulating pole piece spacer 1002*a* (as distinct from the first spacer 304*a*) may be provided between the first support member 126*a* and the pole pieces 112. Although not shown in FIG. 10, a second non-magnetic, electrically insulating pole piece spacer 1002*b* may be provided between the second support member 126*b* and the pole pieces 112. This helps to break the flux path from the pole pieces to the first support member, thereby enhancing the flux shield effect.

Figure 11:
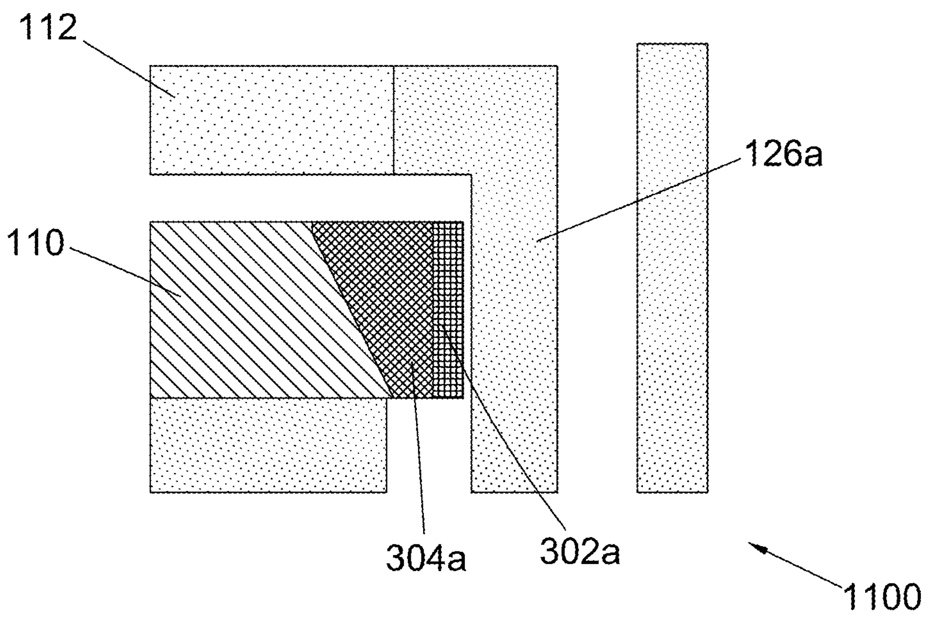
FIG. 11 shows a tenth magnetically geared apparatus according to the present disclosure.

As shown in the eleventh magnetically geared apparatus 1100 of FIG. 11, the plurality of first permanent magnets 110 may be chamfered at a first axial end thereof, such that a radially outer edge of each of the first permanent magnets is shorter than a radially inner edge of each of the first permanent magnets. This advantageously increases the reluctance of the path closest to the pole pieces 112. The spacer 304*a* is wedge-shaped and similarly chamfered to account for and correspond to the chamfer of the first permanent magnets 110. In particular, a radially inner edge of the spacer 304*a* is shorter than a radially outer edge of the spacer 304*a*. Although not shown in FIG. 11, the second spacer 304*b* may also be wedge-shaped, with a radially outer edge of the second spacer 304*b* having a greater axial length than a radially inner edge.

Figure 12:
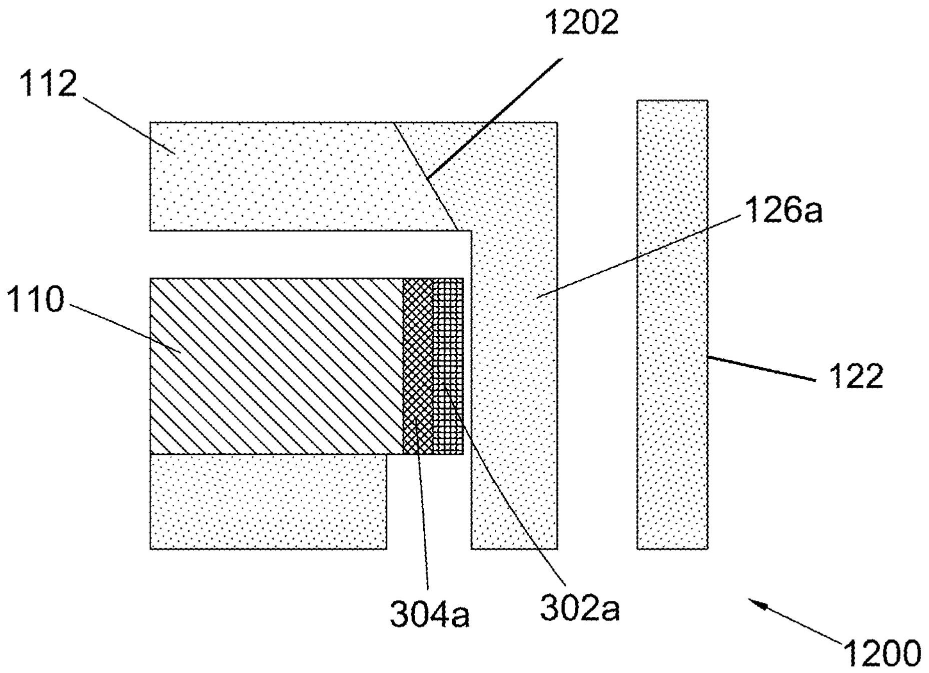
FIG. 12 shows an eleventh magnetically geared apparatus according to the present disclosure.
Figure 13:
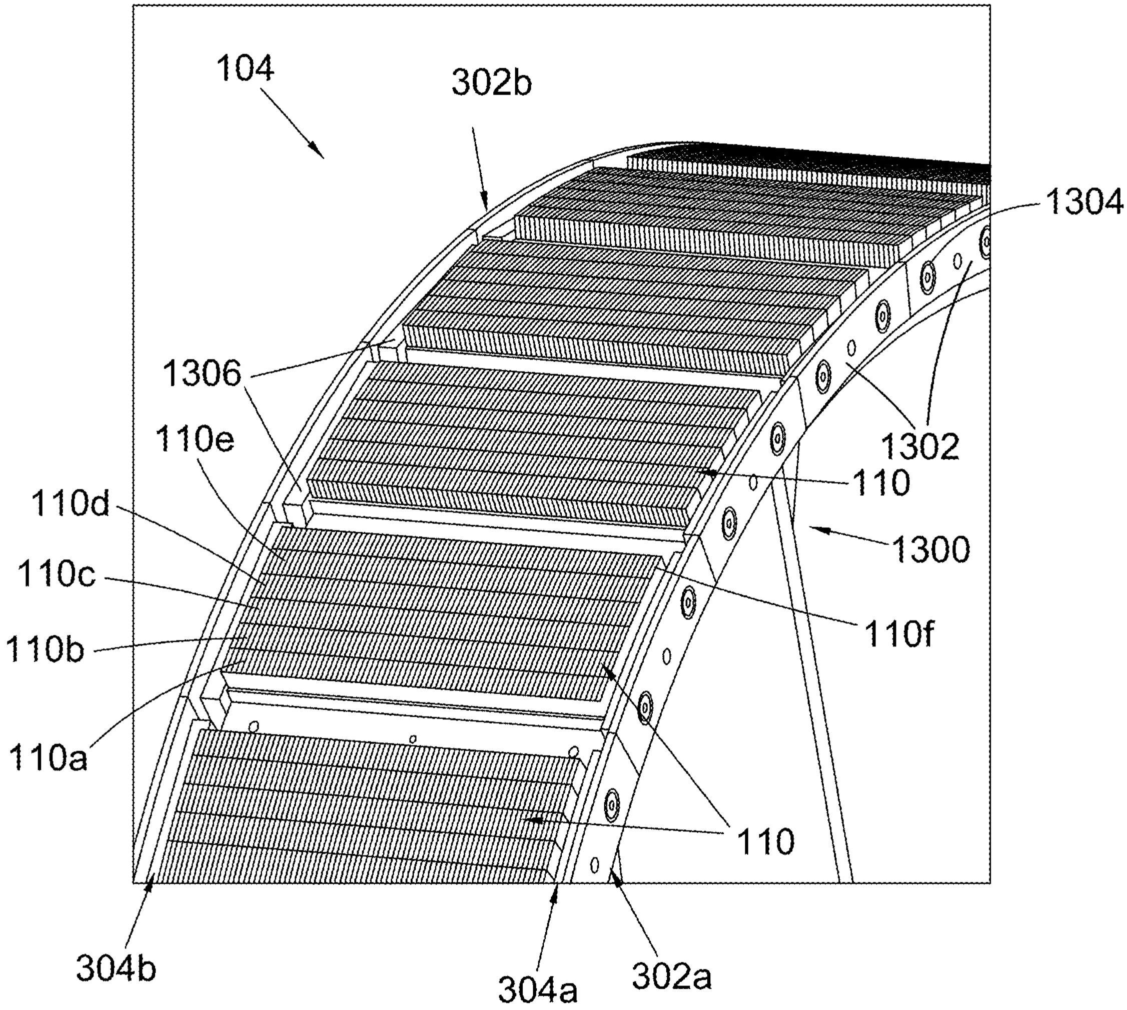
FIG. 13 shows a rotor according to the present disclosure.

FIG. 12 shows a twelfth example of a magnetically geared apparatus 1200, according to the present disclosure. The pole pieces 112 of the twelfth example are chamfered 1202, such that the radially inner edge of the plurality of pole pieces 112 has a greater axial length than a radially outer edge thereof. In addition, the radially outer edge length is similar or the same as the radially outer edge length of the plurality of permanent magnets 110. This advantageously increases the reluctance of the path closest to the first permanent magnets 110. The first support member 126*a* may be similarly tapered to conform to the taper of the pole pieces 112. Although not shown in FIG. 12, the other axial end of the pole pieces 112 may be similarly chamfered.

FIG. 13 shows a rotor 104 according to the present disclosure, for use as the first rotor 104 in the first magnetically geared apparatus 100, or as the first rotor 104 in the second magnetically geared apparatus 200. The rotor 104 includes a plurality of circumferentially arranged first permanent magnets 110, mounted to a first permanent magnet support structure 1300. Each of the first permanent magnets 110 is laminated in the axial direction, and is segmented in the circumferential direction. In the illustrated example, each of the first permanent magnets 110 includes six axially laminated circumferential segments 110*a*-110*f*, each segment being an axial row of axially laminated permanent magnets 110. By configuring the permanent magnets in this way, losses due to eddy currents are minimised. The first permanent magnets 110 are spaced from one another in the circumferential direction.

The rotor 104 of FIG. 13 makes use of the flux shield and electrically insulating region concepts previously described. A first annular flux shield 302*a* is bolted or otherwise attached to a first axial end of the first rotor 104; and a second annular flux shield 302*b* is bolted or otherwise attached to a second axial end of the first rotor 104. Where the bolts are steel, they may be electrically insulated from the flux shields 302*a*, 302*b* by an insulating material, for example by an insulating coating or spacer. The steel bolts are non-magnetised. Each of the flux shields 302*a*, 302*b* comprises an annular ring having, for example, the same diameter as the first rotor 104, and being axially aligned with the plurality of circumferentially arranged first permanent magnets 110. Each flux shield 302*a*, 302*b* has an outer diameter that generally matches or exceeds an outer diameter of the plurality of first permanent magnets 110, and an inner diameter that generally matches an inner diameter of the plurality of first permanent magnets 110. In some examples, the flux shield may extend radially outwards of the outer diameter of the plurality of first permanent magnets, and/or protrude radially inwards of the inner diameter of the plurality of first permanent magnets.

Each of the flux shields 302*a*, 302*b* is segmented in the circumferential direction. In the example shown, the number of first permanent magnets 110 is equal to the number of flux shield segments 1302, with each flux shield segment 1302 being axially aligned with a respective axial end of one of the first permanent magnets 110. The flux shield segments 1302 are affixed to the first rotor 104 by bolts 1304. The flux shield segments are separated from one another by a (small) air gap, for simplicity of construction. Additionally, where the flux shield comprises an electrical conductor, the air gap may help to reduce eddy currents in the flux shield.

Positioned between the first permanent magnets 110 and the first flux shield 302*a* is an electrically insulating region, in this case the first spacer 304*a*. Positioned between the first permanent magnets 110 and the second flux shield 302*b* is another electrically insulating region, in this case the second spacer 304*b*. Similarly to the flux shields 302*a*, 302*b*, the first and second spacers 304*a*, 304*b* are segmented in the circumferential direction. That is to say, between each flux shield segment 1302 and its respective first permanent magnet 110 is a respective spacer segment 1306. In other words, each circumferential spacer segment 1306 is interposed between a respective first permanent magnet 110 and flux shield segment 1302 pair. Spacer segments 1306 are also affixed to the first rotor by the bolts 1304.

Figure 14:
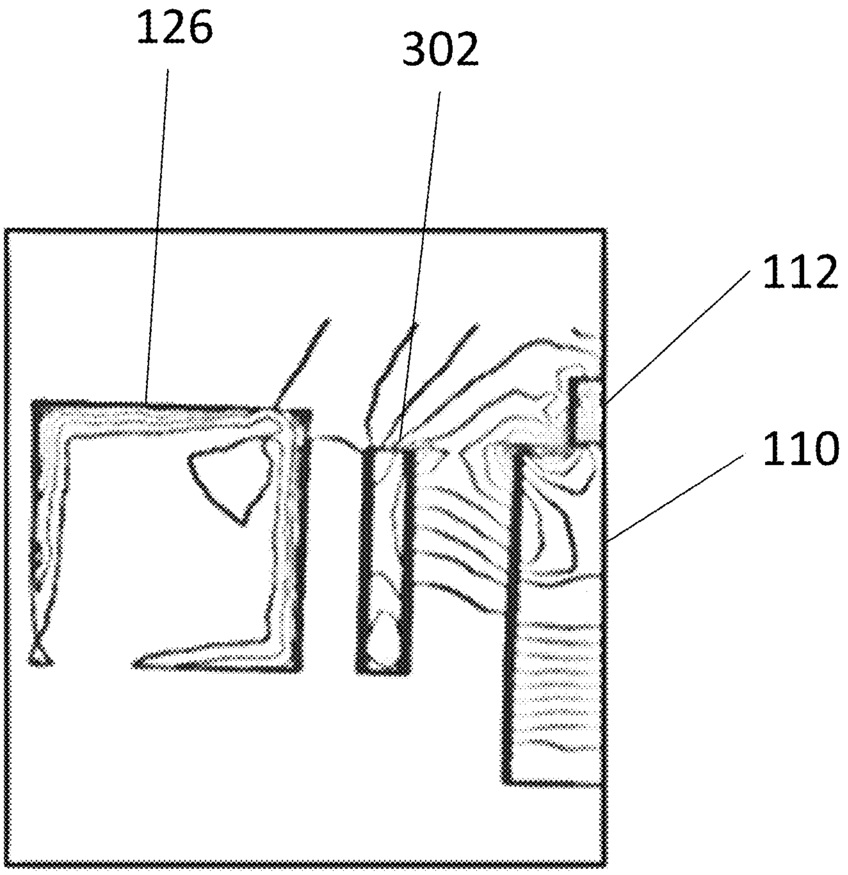
FIG. 14 shows an illustration of axial flux leakage within a magnetically geared apparatus according to the present disclosure.

FIG. 14 illustrates how the flux shield 302 intercepts axial flux lines extending from an axial end of the plurality of first permanent magnets 110, and redirects those flux lines back towards the first permanent magnets 110 and pole pieces 112, thereby substantially reducing the amount of axial flux that reaches the support member 126. In effect, the flux shield 302 provides a magnetic path for the axial magnetic leakage field to return to the permanent magnet rotor, reducing the magnitude of field propagating in the surrounding structure. This in turn reduces eddy currents in the surrounding structure.

Figure 15A:
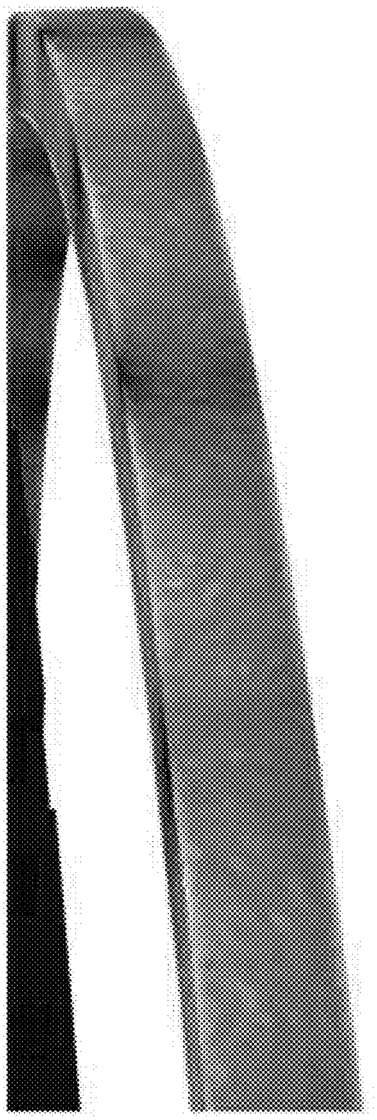
FIG. 15*a* shows magnetic flux density in a support member within a magnetically geared apparatus according to the prior art.
Figure 15B:
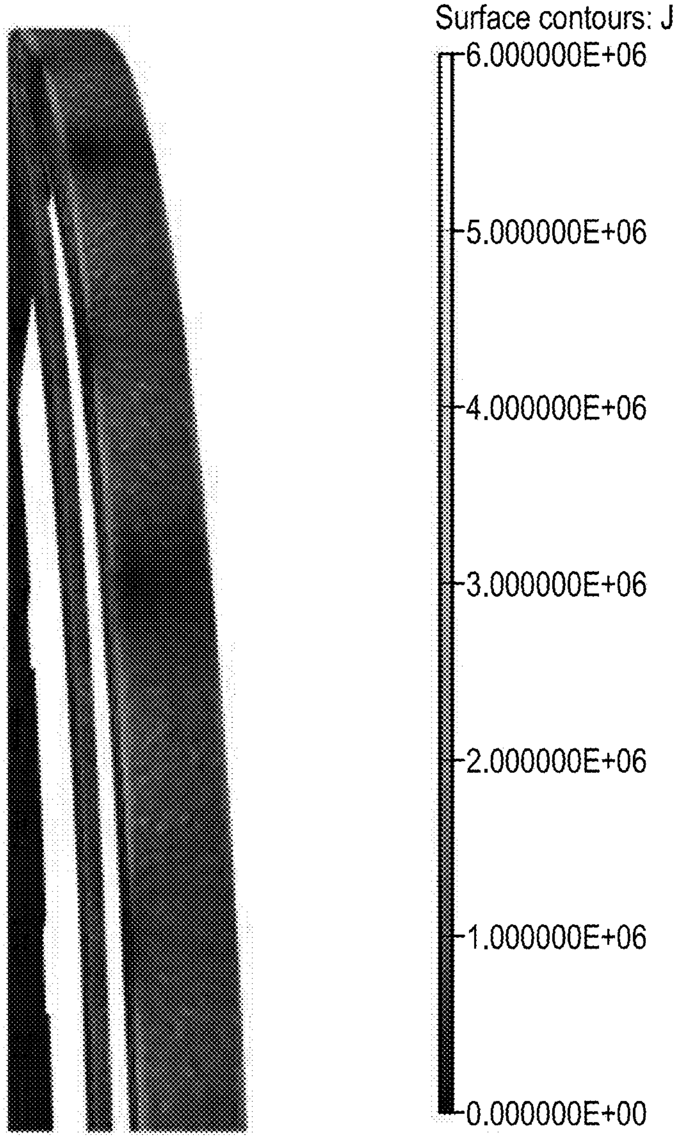
FIG. 15*b* shows magnetic flux density in a support member within a magnetically geared apparatus according to the present disclosure.

FIG. 15*a* shows magnetic flux density in a support member 126 within a magnetically geared apparatus according to FIGS. 1*a*-1*b* or 2*a*-2*b*. FIG. 15*b* shows magnetic flux density in a support member 126 within a magnetically geared apparatus according to the present disclosure, with a flux shield 302 present. As can be seen, the magnetic flux density in the support member 126 is substantially reduced where the flux shield 302 is used. Eddy currents are thereby also reduced.

As has been discussed above, the flux shield may include slits, holes and/or pockets to further prevent losses within the magnetically geared apparatus. This may be particularly important where the flux shield comprises a conductor, such as copper. In such examples, eddy currents may be supported in the flux shield, which may lead to Ohmic losses. By including slits, holes and/or pockets, any such currents must follow a tortuous path through the flux shield. Because the length of the path that the eddy currents must travel is increased, Ohmic losses are reduced.

Figure 16A:
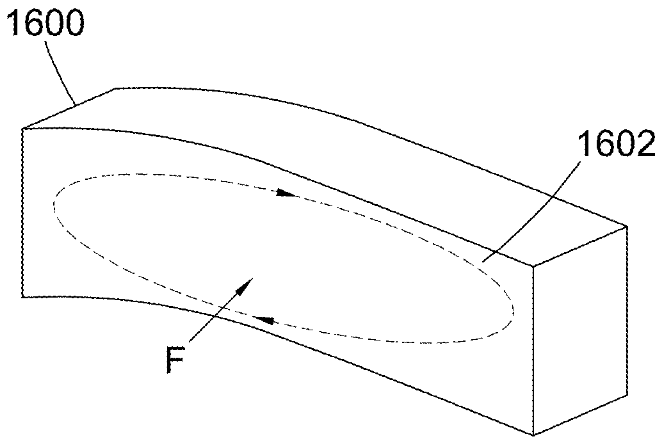
FIGS. 16*a*-16*d* show various flux shield structures for use in any of the examples in the present disclosure.

FIG. 16*a* shows a pole piece segment 1600 having no slits, holes or pockets. An oval eddy current path 1602 is formed in response to the axial flux F.

Figure 16B:
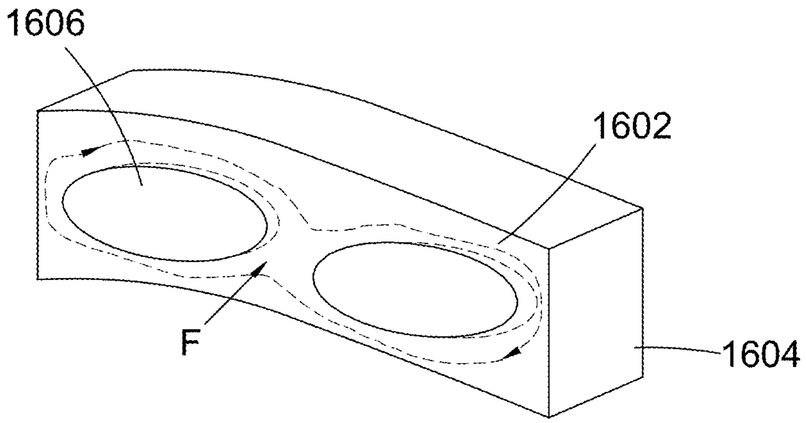

FIG. 16*b* shows a pole piece segment 1604 having pockets 1606 formed therein. The pockets do not extend all of the way through the flux shield segment 1604. As shown, an eddy current path 1608 is formed around the pockets 1606.

Figure 16C:
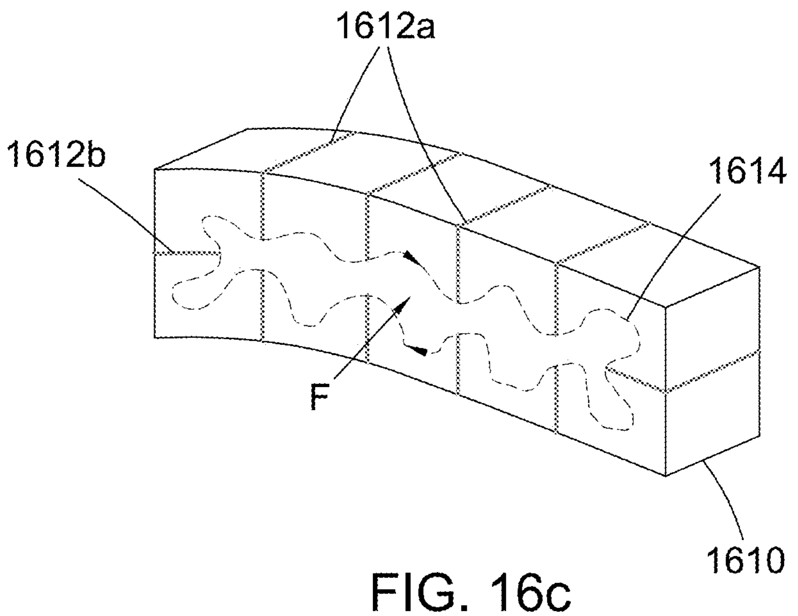

FIG. 16*c* shows a pole piece segment 1610 having slits 1612*a*, 1612*b* formed therein. Slits 1612*a* extend radially into the pole piece segment 1610. Slits 1612*b* extend circumferentially into the pole piece segment 1610. An eddy current path 1614 is formed around the slits 1612*a*, 1612*b*.

Figure 16D:
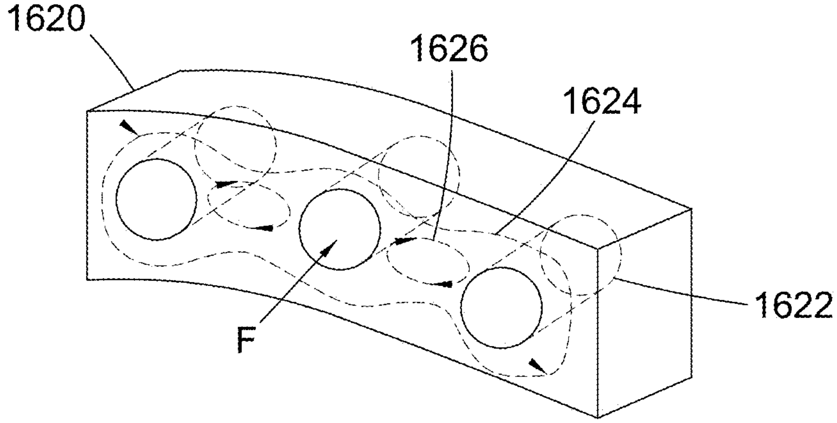

FIG. 16*d* shows a pole piece segment 1620 having holes 1622 formed therethrough. The holes 1622 extend axially through the segment 1620. Eddy current paths 1624, 1626 are formed around the slits holes 1622.

Figure 17:
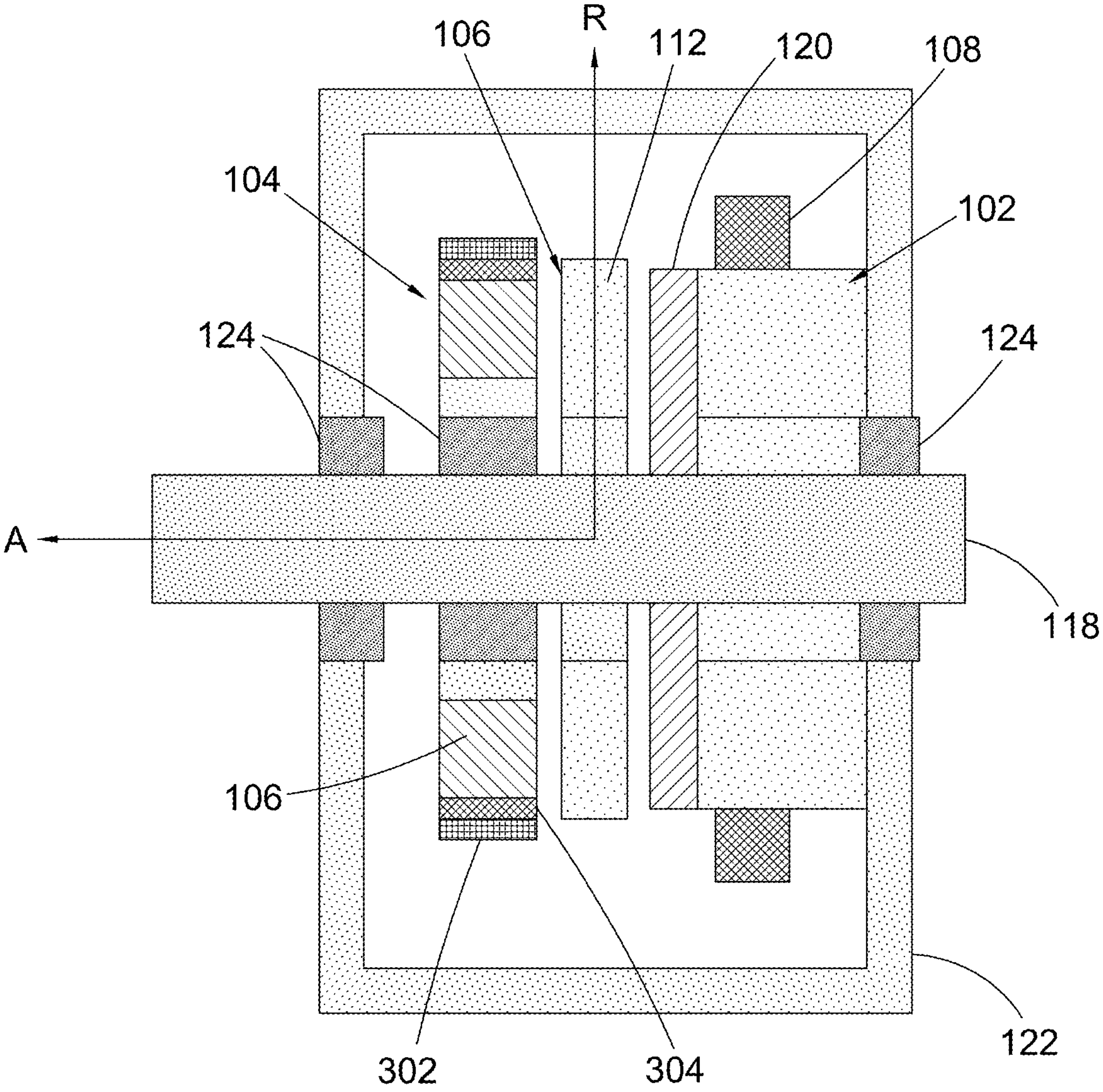
FIG. 17 shows a first axially-arranged magnetically geared apparatus according to the present disclosure.
Figure 18:
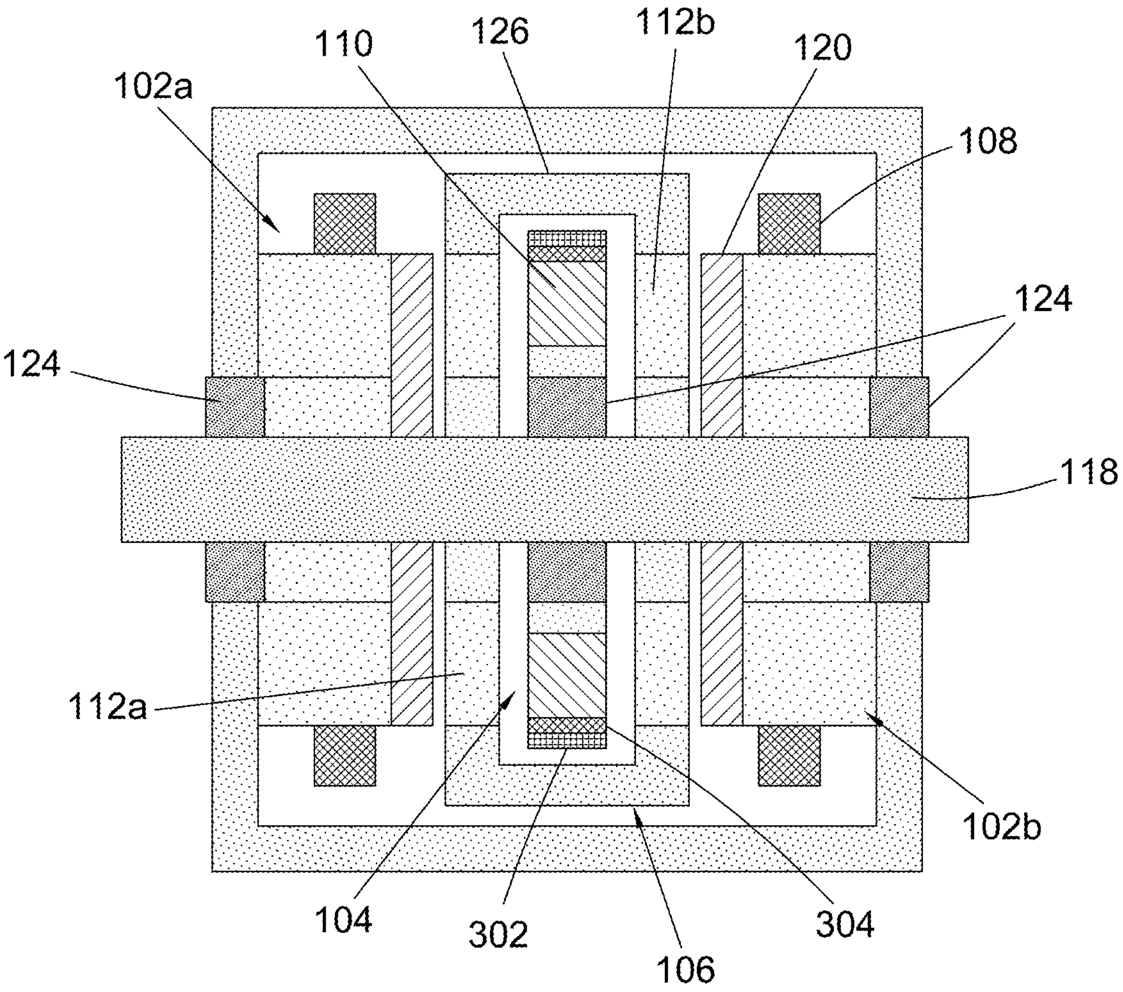
FIG. 18 shows a second axially-arranged magnetically geared apparatus according to the present disclosure.
Figure 19:
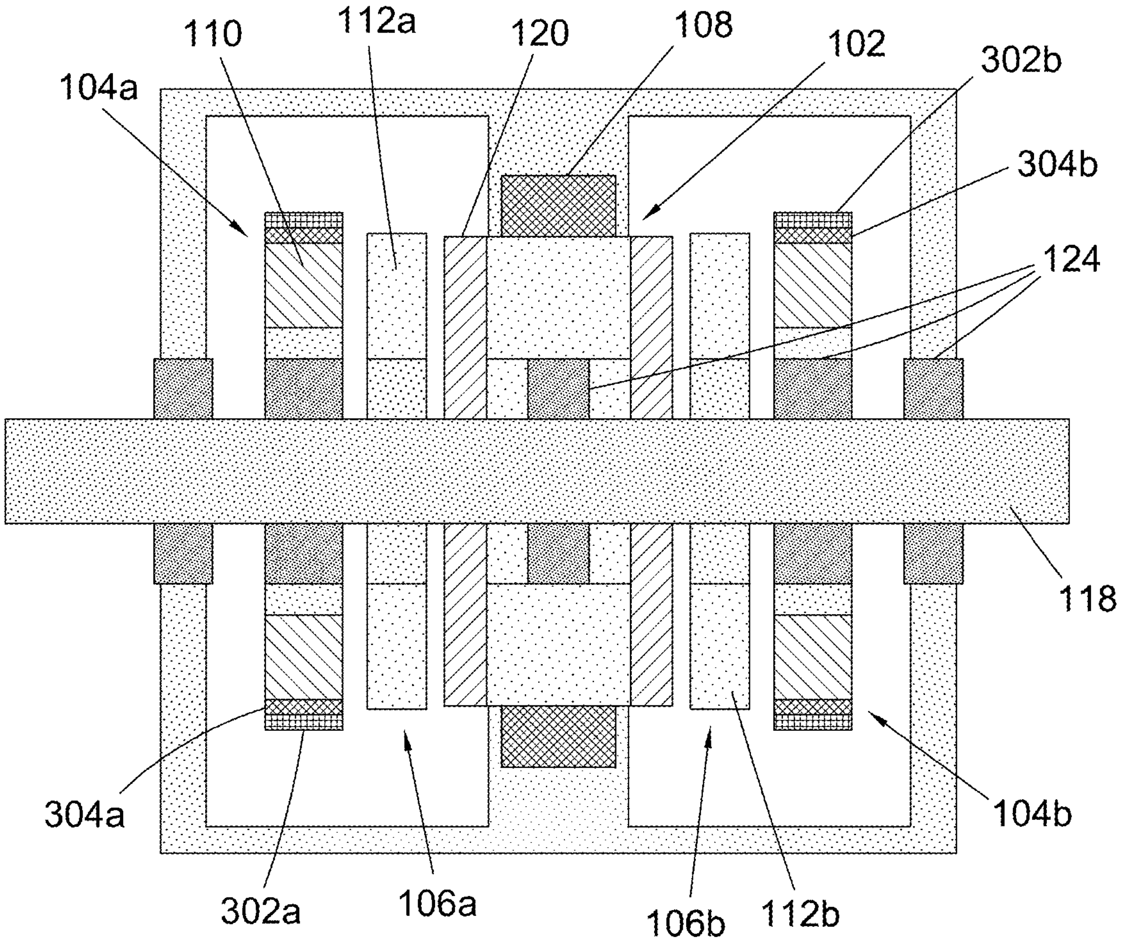
FIG. 19 shows a third axially-arranged magnetically geared apparatus according to the present disclosure.
Figure 20:
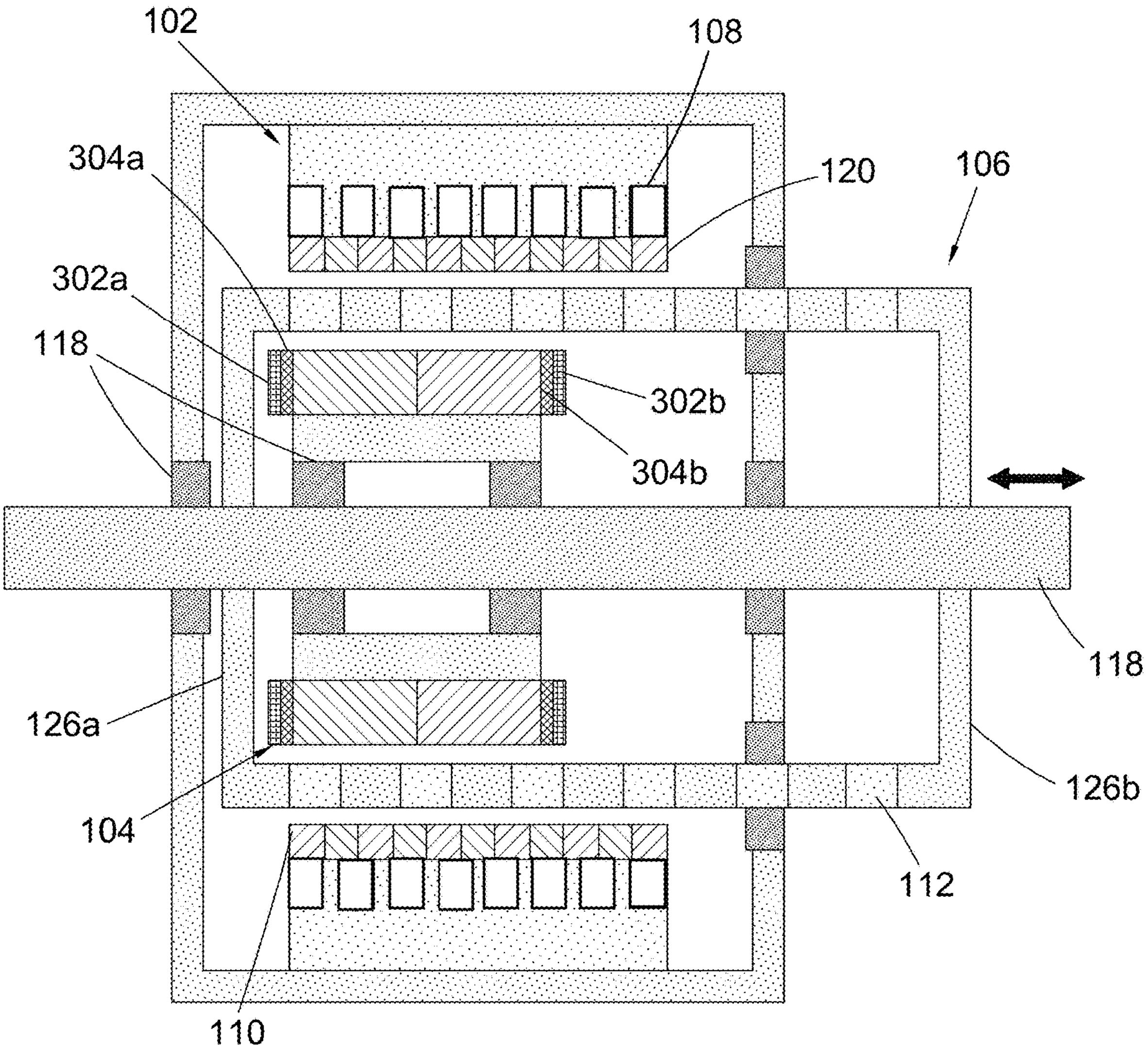
FIG. 20 shows a linear magnetically geared apparatus according to the present disclosure.

In the above examples, a radial arrangement of the magnetic apparatus has been focused on. However, as the reader will appreciate, an axial arrangement could alternatively be used. FIG. 17 shows a first axial arrangement; FIG. 18 shows a second axial arrangement; FIG. 19 shows a third axial arrangement. FIG. 20 shows a radial-arrangement, but in which the apparatus is configured for linear axial movement rather than rotational movement.

In FIG. 17, the stator 102, first rotor 104, and second rotor 106 are each arranged around the rotatable output shaft 118. However, rather than being arranged concentrically relative to one another as in previous examples, the stator 102 is located towards a first axial end of the apparatus, the first rotor 104 is located towards a second axial end of the apparatus, and the second rotor 106 is located axially between the stator 102 and the first rotor 104. Thus, the first rotor 104, the second rotor 106 and the stator 102 are axially separated. In this arrangement, axial flux is desired while radial flux is not wanted. Accordingly, the flux shield 302 is radially aligned with the first plurality of permanent magnets 110 so as to be located between the first plurality of permanent magnets 110 and the casing 122. The flux shield 302 is radially spaced from the first plurality of permanent magnets 110 by the spacer 304. However, as the reader will appreciate, the flux shield 302 could alternatively be spaced from the first plurality of permanent magnets 110 by an air gap.

Also labelled on FIG. 17 are the radial direction R, and the axial direction A. The radial direction R is perpendicular to the axial direction A. As can be seen, the stator 102, first rotor 104, and second rotor 106 are spaced from one another in the axial direction A. In other words, the stator 102, first rotor 104 and the second rotor 106 are aligned with each other in the axial direction A. The flux shield 302, on the other hand, is aligned with the first permanent magnets 110 in the radial direction, and is spaced from the first permanent magnets 110 in the radial direction. Accordingly, the flux shield 302 attenuates flux straying in the radial direction, and encourages flux to propagate in the axial direction—i.e. axially towards the pole pieces 112 and the stator 102.

The second axial arrangement of FIG. 18 is a modification of the axial arrangement in FIG. 17. The apparatus includes a stator 102 which includes a first stator portion 102*a* at a first axial end, and a second stator portion 102*b* at a second axial end. First rotor 104 is located at an axial centre of the apparatus. A second rotor 106 is arranged such that a first plurality of pole pieces 112*a* are arranged axially between the first stator portion 102*a* and the first rotor 104; and such that a second plurality of pole pieces 112*b* are arranged axially between the second stator portion 102*b* and the first rotor 104. Pole piece support member 126 mechanically couples the first plurality of pole pieces 112*a* with the second plurality of pole pieces 112*b*. Again, axial flux is desired while radial flux is not wanted. Accordingly, the flux shield 302 is radially aligned with the first plurality of permanent magnets 110 so as to be located between the first plurality of permanent magnets 110 and pole piece support member 126. The flux shield 302 is radially spaced from the first plurality of permanent magnets 110 by the spacer 304. However, as the reader will appreciate, the flux shield 302 could alternatively be spaced from the first plurality of permanent magnets 110 by an air gap.

As the reader will understand, the second stator portion 102*b* and the second plurality of pole pieces 112*b* could be dispensed with, and as such are not essential.

The third axial arrangement of FIG. 19 is an alternative modification of the axial arrangement in FIG. 17. The apparatus includes a first permanent magnet rotor 104*a* at a first axial end, and a second permanent magnet rotor 104*b* at a second axial end. Stator 102 is located at an axial centre of the apparatus. A first pole piece rotor 106*a* is arranged such that a first plurality of pole pieces 112*a* are arranged axially between the first permanent magnet rotor 104*a* and the stator 102; and a second pole piece rotor 106*b* is arranged such that a second plurality of pole pieces 112*b* are arranged axially between the second permanent magnet rotor 104*b* and the stator 102. Again, axial flux is desired while radial flux is not wanted. Accordingly, a first flux shield 302*a* is radially aligned with the permanent magnets 110 of the first rotor 104*a,* and a second flux shield 302*b* is radially aligned with the permanent magnets 110 of the second rotor 104*b*. Each flux shield 302*a,* 302*b* is radially spaced from the first plurality of permanent magnets 110 by a respective spacer 304*a,* 304*b*. However, as the reader will appreciate, each flux shield 302*a,* 302*b* could alternatively be spaced from the first plurality of permanent magnets 110 by a respective air gap.

FIG. 20 shows the linear arrangement. In FIG. 20, the stator 102, first translator 104 and second translator 106 are concentrically arranged around the translatable output shaft 118, such that the stator 102 is located radially outside of the first translator 104, and such that the second translator 106 is located radially between the stator 102 and the first translator 104. As shown, the second translator 106 is coupled to the output shaft 118. Each of the output shaft 118, the first translator 104, and the second translator 106 are configured to translate axially relative to the stator 102. The windings 108 are wound toroidally around the stator 102. As with previous examples, the first translator 104 comprises a first plurality of permanent magnets 110; the stator 102 comprises a second plurality of permanent magnets 120 and a plurality of windings 108; and the second translator 106 comprises a plurality of pole pieces 112 and support members 126*a,* 126*b*. In this example, radial flux is desired and axial flux is not wanted. Accordingly, a first flux shield 302*a* is axially aligned with the first plurality of permanent magnets 110 so as to be located between the first plurality of permanent magnets 110 and the first support member 126*a;* and a second flux shield 302*b* is axially aligned with the first plurality of permanent magnets 110 so as to be located between the first plurality of permanent magnets 110 and the second support member 126*b*. Each flux shield 302*a,* 302*b* is spaced from the first plurality of permanent magnets 110 by a respective spacer 304*a,* 304*b*. However, as the reader will appreciate, each flux shield 302*a,* 302*b* could alternatively be spaced from the first plurality of permanent magnets 110 by a respective air gap.

Figure 21:
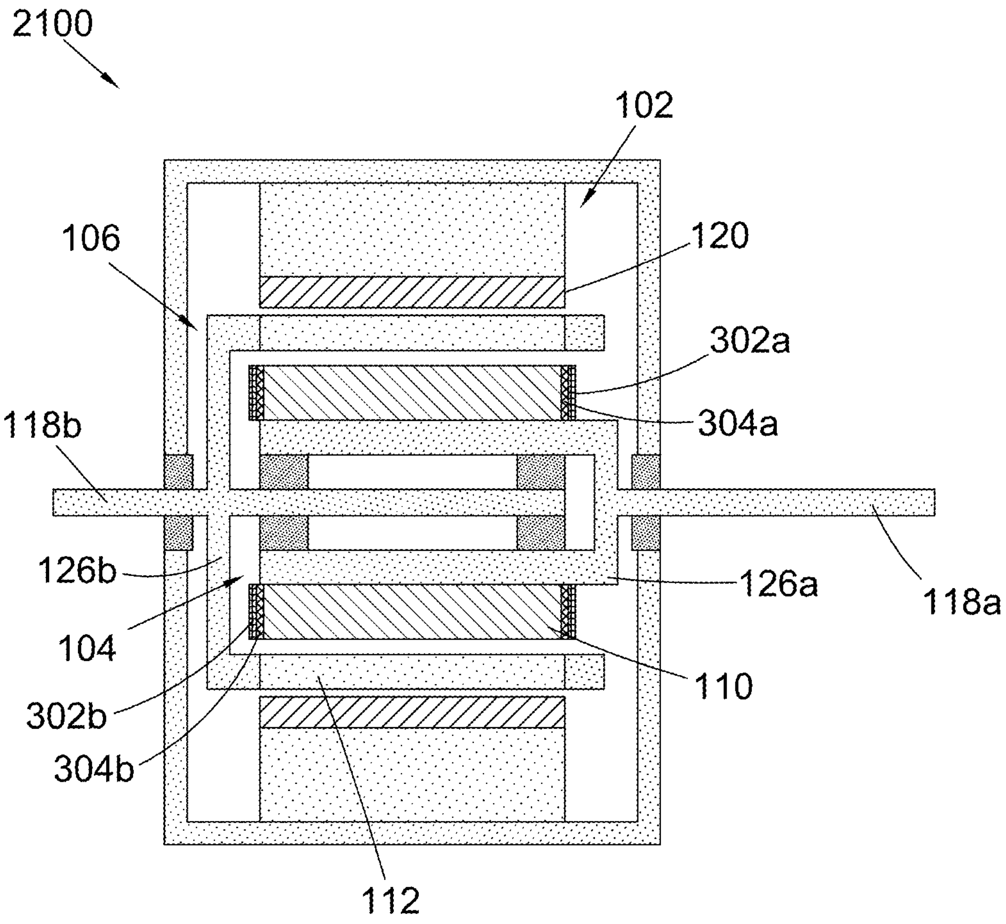
FIG. 21 shows a first magnetic gear according to the present disclosure.

FIG. 21 shows a magnetic gear 2100 according to the present disclosure. The magnetic gear 2100 is in most respects the same as the magnetic gear 300 from FIG. 3*a*, save for one key difference. In particular, whereas the magnetically geared apparatus 300 comprises only windings 108 on the stator 102, the magnetic gear 2100 comprises only second permanent magnets 120 on the stator 102. The presence of the second permanent magnets 120 (rather than windings) on the stator 102 in FIG. 21 may make the apparatus 2100 suitable for use as a magnetic gear, rather than as a power split device.

Figure 22:
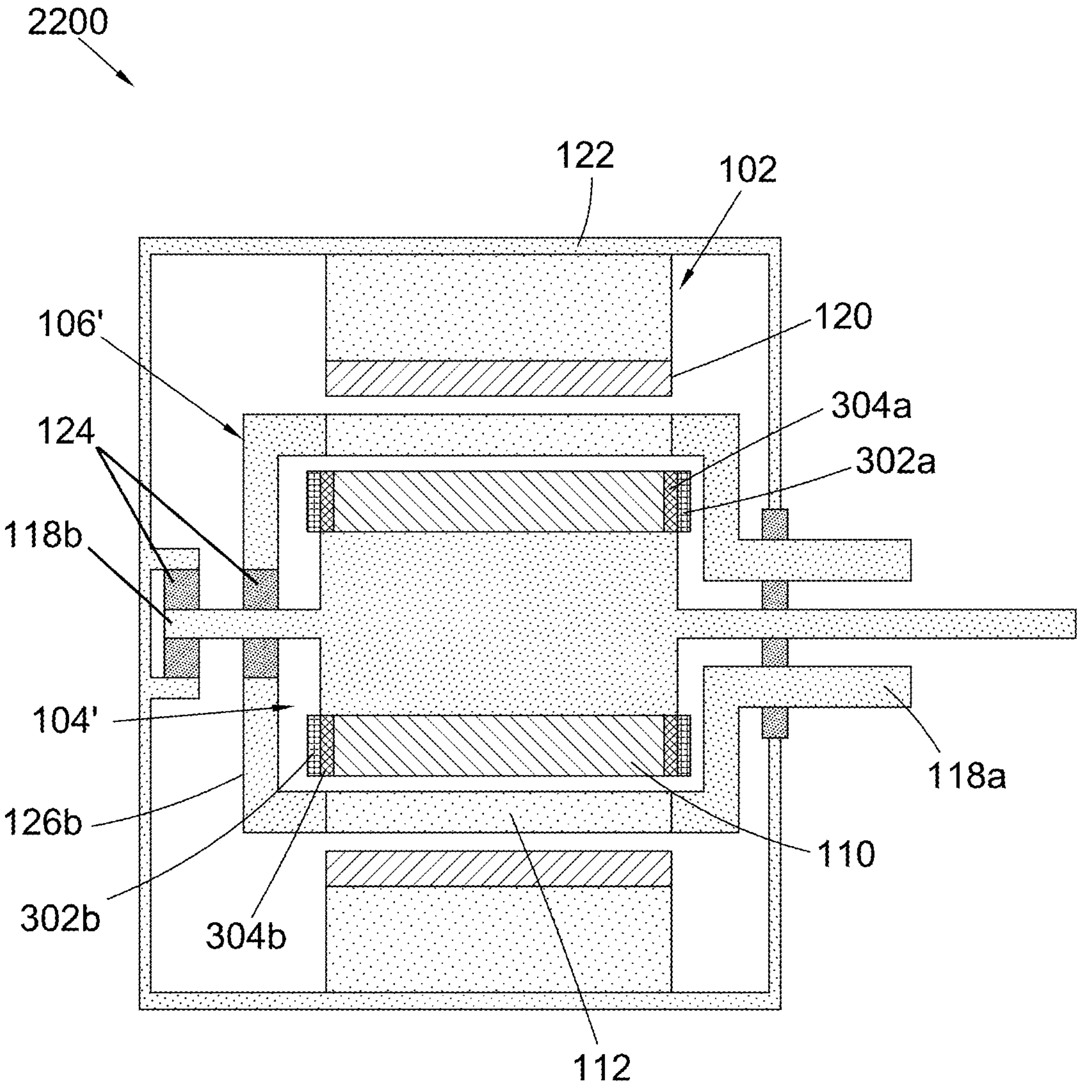
FIG. 22 shows a second magnetic gear according to the present disclosure.

Similarly, FIG. 22 shows a magnetic gear 2200 which is in all respects the same as the magnetic gear 300' from FIG. 3*b*, save for one key difference. In particular, whereas the magnetically geared apparatus 300' comprises only windings 108 on the stator 102, the magnetic gear 2200 comprises only second permanent magnets 120 on the stator 102. It is the presence of the second permanent magnets 120 (rather than windings) on the stator 102 in FIG. 22 which makes the apparatus 2200 suitable for use as a magnetic gear, rather than as a power split device.

Figure 23:
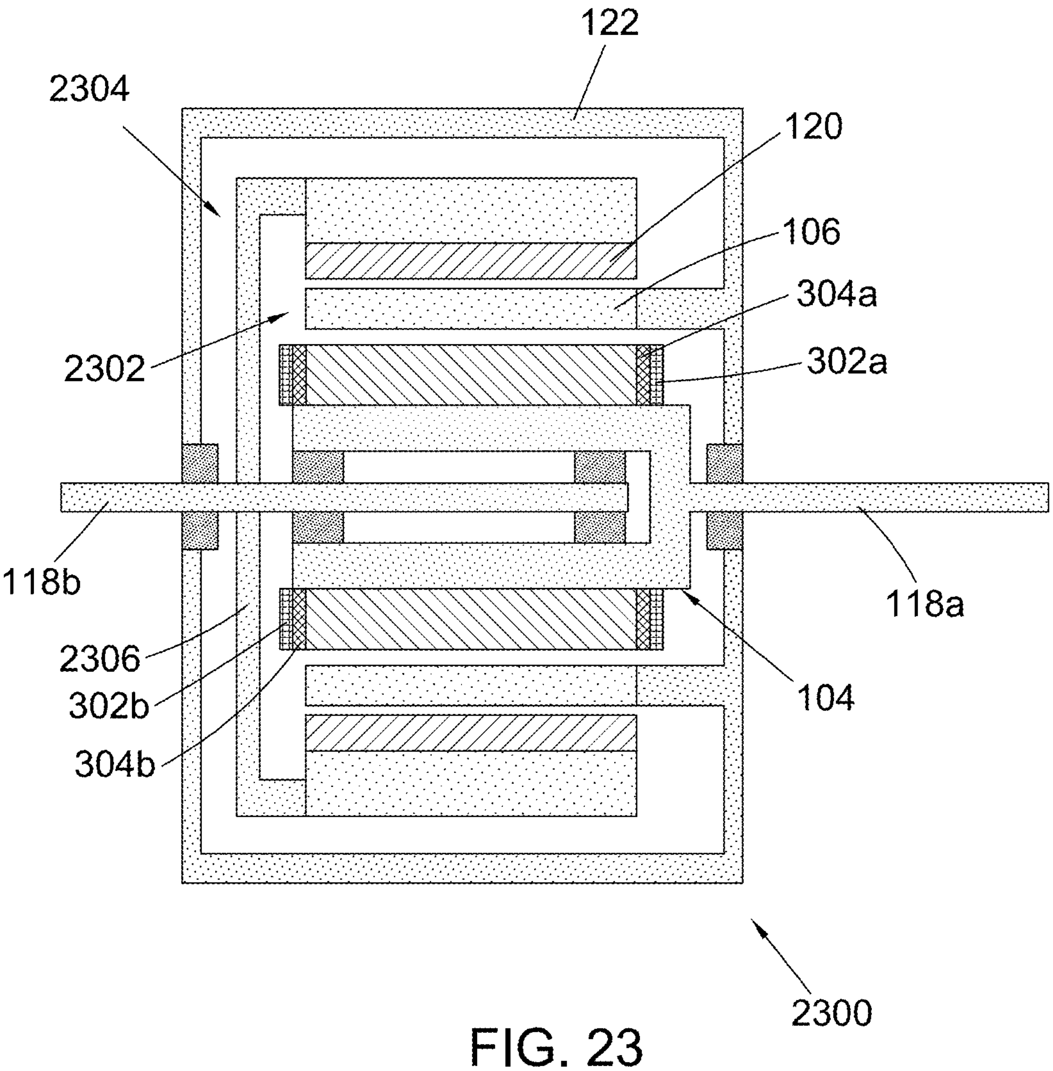
FIG. 23 shows a third magnetic gear according to the present disclosure.

FIG. 23 shows further magnetic gear 2300 according to the present disclosure. In the magnetic gear 2300, the pole pieces 112 are mounted on a stator 2302 (which in turn is coupled to the casing 122), and the plurality of second permanent magnets 120 are mounted on a second rotor 2304. The stator 2302 carrying the pole pieces 106 is located between the first rotor 104 and the second rotor 2304. The second rotor 2304 is open at a first axial end, and comprises a steel support member 2306 at a second axial end (i.e. has an open cup structure). The first rotor 104 similarly has an open cup structure, and is open at its second axial end. The first rotor 104 is coupled to an input shaft 118*a*, so as to be driven by the input shaft 118*a*. The second rotor 2304 is coupled to an output shaft 118*b* so as to drive the output shaft 118*b*. The input shaft 118*a* extends from a first axial end of the magnetic gear 2300. The first flux shield 302*a* at the first axial end of the first permanent magnets 110 acts to prevent stray axial flux from reaching the casing 122. The second flux shield 302*b* acts to prevent stray axial flux from reaching the steel support member 2306.

Figure 24:
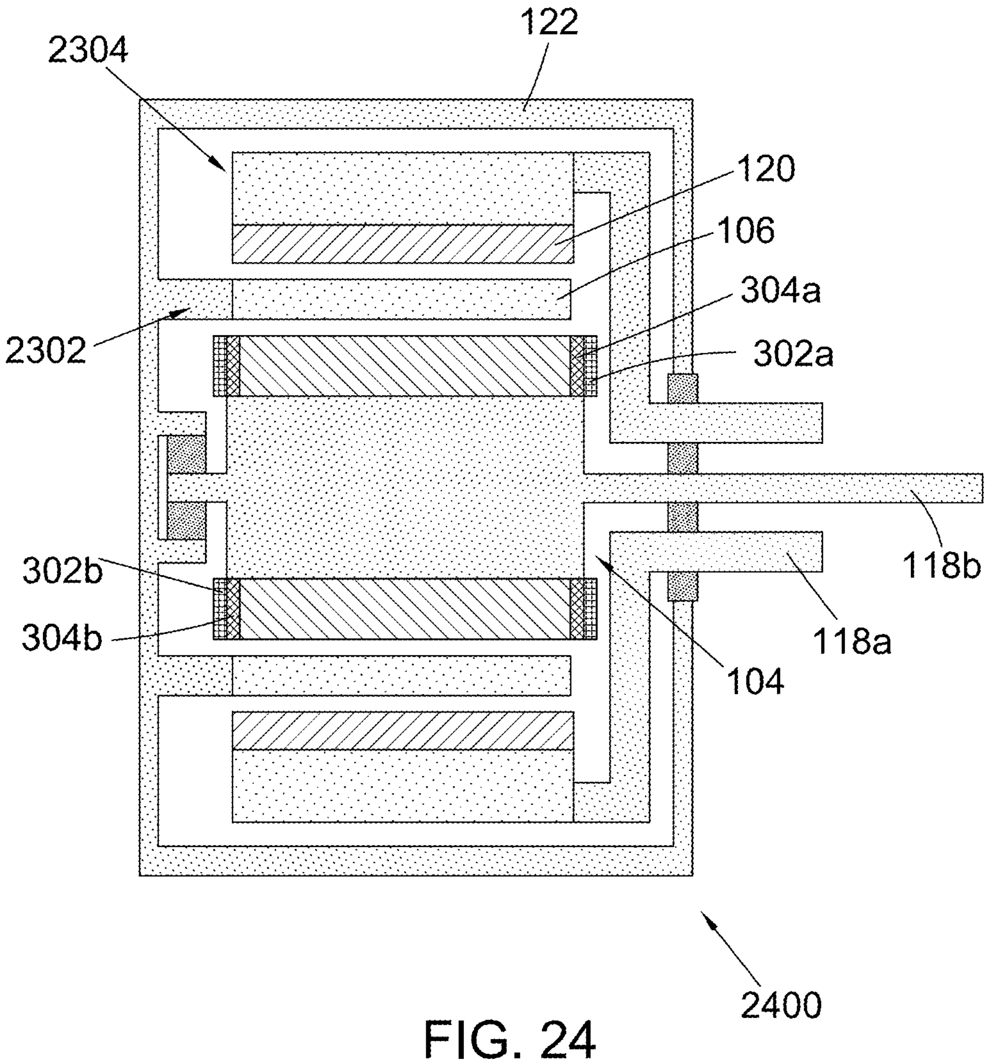
FIG. 24 shows a fourth magnetic gear according to the present disclosure.

Finally, FIG. 24 shows a variation 2400 of the magnetic gear 2300 shown in FIG. 23. Rather than having the input shaft 118*a* extending from the first axial end and the output shaft 118*b* extending from the second axial end as in FIG. 23, the magnetic gear 2400 of FIG. 24 has both the input and output shafts 118*a*, 118*b* extending from the first axial end of the magnetic gear 2400. Moreover, the input shaft 118*a*, which is mechanically coupled to the first rotor 104, is concentrically arranged with the hollow output shaft 118*b*. The hollow output shaft 118*b* is mechanically coupled to the steel support member 2306.

The term "comprising" should be interpreted as meaning "including but not limited to", such that it does not exclude the presence of features not listed. The examples described and shown in the accompanying drawings are provided as examples of ways in which the invention may be put into effect and are not intended to be limiting on the scope of the invention. Modifications may be made, and elements may be replaced with functionally and structurally equivalent parts, and features of different embodiments may be combined without departing from the disclosure. In particular, the features described in the above examples may be combined with one another insofar as such a combination is technically possible. For example, any one of the examples described above may use flux shields that are shaped as shown in FIG. 8*a*, 8*b* or 9, or may surround an exterior edge of the spacer as shown in FIG. 9. In any of the examples above, a spacer 1002*a* as shown in FIG. 10 may be included. In any of the examples above, axial ends of the plurality of first permanent magnets 110 may be chamfered as shown in FIG. 11, and/or axial ends of the pole pieces 112 may be chamfered as shown in FIG. 12.

The invention claimed is:

1. A magnetically geared apparatus comprising:

a first mover comprising a plurality of first permanent magnets;

a stator;

a second mover; and a flux shield aligned with the plurality of first permanent magnets for attenuating magnetic flux, wherein one of the stator or the second mover comprises a plurality of pole pieces and is positioned between the first mover and another of the stator or the second mover, wherein the first mover, the stator and the second mover are aligned in a first direction, wherein the flux shield is spaced from the plurality of first permanent magnets in a second direction perpendicular to the first direction by a non-magnetic region, thereby attenuating the magnetic flux in the second direction, wherein the plurality of first permanent magnets is circumferentially arranged such that each of the plurality of first permanent magnets occupies a predefined arc length, and wherein the flux shield is axially spaced from the plurality of first permanent magnets by a distance that is between one tenth and one half of the predefined arc length.

2. The magnetically geared apparatus of claim 1, wherein the first mover, the stator and the second mover are concentrically arranged around a shaft.

3. The magnetically geared apparatus of claim 2, wherein the second mover comprises an electrically conductive pole piece support structure mechanically coupled to the shaft; and wherein the flux shield is located between the plurality of first permanent magnets and the electrically conductive pole piece support structure; and wherein the plurality of pole pieces are coupled to the electrically conductive pole piece support structure via an electrically insulating pole piece spacer, such that the plurality of pole pieces are axially spaced from the electrically conductive pole piece support structure by the electrically insulating pole piece spacer.

4. The magnetically geared apparatus of claim 1, wherein the first mover, the stator and the second mover are housed within a metal casing, and wherein the flux shield is located between the plurality of first permanent magnets and the metal casing.

5. The magnetically geared apparatus of claim 1, wherein the first mover comprises a permanent magnet support structure, and wherein the flux shield is mechanically coupled to the permanent magnet support structure.

6. The magnetically geared apparatus of claim 1, wherein the non-magnetic region is a non-magnetic, electrically insulating spacer.

7. The magnetically geared apparatus of claim 1, wherein the non-magnetic region comprises an air gap.

8. The magnetically geared apparatus of claim 1, wherein the flux shield comprises a conductor.

9. The magnetically geared apparatus of claim 1, wherein the flux shield comprises an un-magnetised magnetisable material, and wherein the flux shield comprises one of a laminate and a soft magnetic composite "SMC".

10. The magnetically geared apparatus of claim 1, wherein the flux shield comprises an annular ring, and wherein the flux shield comprises a plurality of circumferential segments arranged to form the annular ring, the plurality of circumferential segments being circumferentially spaced from one another.

11. The magnetically geared apparatus of claim 1, wherein the another of the stator and the second mover comprises a plurality of second permanent magnets.

12. The magnetically geared apparatus of claim 1, wherein the stator comprises a plurality of windings, and the second mover is located between the stator and the first mover and comprises the plurality of pole pieces.

13. The magnetically geared apparatus of claim 12, wherein the stator further comprises a plurality of second permanent magnets, and wherein the plurality of second permanent magnets are arranged between the plurality of windings and the second mover.

14. A magnetically geared apparatus comprising:

a first mover comprising a plurality of first permanent magnets;

a stator;

a second mover; and a flux shield aligned with the plurality of first permanent magnets for attenuating magnetic flux, wherein one of the stator or the second mover comprises a plurality of pole pieces and is positioned between the first mover and another of the stator or the second mover, wherein the first mover, the stator and the second mover are aligned in a first direction, wherein the flux shield is spaced from the plurality of first permanent magnets in a second direction perpendicular to the first direction by a non-magnetic region, thereby attenuating the magnetic flux in the second direction, wherein the first mover, the stator and the second mover are arranged around a shaft and are axially aligned with one another, wherein one of the first mover and the second mover is mechanically coupled to the shaft, wherein the first mover, the stator and the second mover are housed within a metal casing, and wherein the flux shield is located between the plurality of first permanent magnets and the metal casing.

15. A magnetically geared apparatus comprising:

a first mover comprising a plurality of first permanent magnets;

a stator;

a second mover; and a flux shield aligned with the plurality of first permanent magnets for attenuating magnetic flux, wherein one of the stator or the second mover comprises a plurality of pole pieces and is positioned between the first mover and another of the stator or the second mover, wherein the first mover, the stator and the second mover are aligned in a first direction, wherein the flux shield is spaced from the plurality of first permanent magnets in a second direction perpendicular to the first direction by a non-magnetic region, thereby attenuating the magnetic flux in the second direction, wherein the first mover, the stator and the second mover are concentrically arranged around a shaft, wherein the second mover comprises an electrically conductive pole piece support structure mechanically coupled to the shaft, wherein the flux shield is located between the plurality of first permanent magnets and the electrically conductive pole piece support structure, and wherein the plurality of pole pieces are coupled to the electrically conductive pole piece support structure via an electrically insulating pole piece spacer, such that the plurality of pole pieces are axially spaced from the electrically conductive pole piece support structure by the electrically insulating pole piece spacer.

16. The magnetically geared apparatus of claim 15, wherein the plurality of first permanent magnets are circumferentially arranged such that each of the plurality of first permanent magnets occupies a predefined arc length.

* * * * *